United States Patent
Freda et al.

(10) Patent No.: US 11,570,754 B2
(45) Date of Patent: Jan. 31, 2023

(54) METHODS, APPARATUS AND SYSTEMS FOR REALIZING VEHICLE TO VEHICLE COMMUNICATIONS USING LONG TERM EVOLUTION DEVICE TO DEVICE COMMUNICATIONS

(71) Applicant: InterDigital Patent Holdings, Inc., Wilmington, DE (US)

(72) Inventors: Martino M. Freda, Laval (CA); Aata El Hamss, Montreal (CA); Diana Pani, Montreal (CA); Marian Rudolf, Vienna (AT); Paul Marinier, Brossard (CA); Benoit Pelletier, Roxboro (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/894,437

(22) PCT Filed: Aug. 5, 2016

(86) PCT No.: PCT/US2016/045724
§ 371 (c)(1),
(2) Date: Feb. 12, 2018

(87) PCT Pub. No.: WO2017/027355
PCT Pub. Date: Feb. 16, 2017

(65) Prior Publication Data
US 2018/0227882 A1   Aug. 9, 2018

Related U.S. Application Data

(60) Provisional application No. 62/251,013, filed on Nov. 4, 2015, provisional application No. 62/222,580, filed on
(Continued)

(51) Int. Cl.
*H04W 72/02* (2009.01)
*H04W 72/04* (2009.01)
(Continued)

(52) U.S. Cl.
CPC ............ *H04W 72/02* (2013.01); *H04W 4/46* (2018.02); *H04W 8/005* (2013.01);
(Continued)

(58) Field of Classification Search
None
See application file for complete search history.

(56) References Cited

U.S. PATENT DOCUMENTS

2015/0024763 A1* 1/2015 Lee .................. H04W 72/082
455/450
2015/0215903 A1 7/2015 Zhao et al.
(Continued)

FOREIGN PATENT DOCUMENTS

WO WO-2014018333 A2 * 1/2014 ........ H04W 56/0015
WO WO-2015/021185    2/2015

OTHER PUBLICATIONS

"3rd Generation Partnership Project; Technical Specification Group Services and System Aspects; Study on LTE support for V2X services (Release 14)", 3GPP TR 22.885 V0.2.0, Apr. 2015, 33 pages.
(Continued)

*Primary Examiner* — Scott M Sciacca
(74) *Attorney, Agent, or Firm* — Flaster Greenberg, P.C.

(57) ABSTRACT

A method, apparatus, and system of a User Equipment (UE) device executing communications using a Device-to-Device (D2D) Long Term Evolution (LTE) network are provided. The method includes determining D2D devices communicating in an area, determining whether D2D data is to be transmitted, determining one or more resource sets for transmitting the D2D data, and transmitting the D2D data using the determined one or more resource sets.

20 Claims, 13 Drawing Sheets

Related U.S. Application Data on Sep. 23, 2015, provisional application No. 62/204,297, filed on Aug. 12, 2015.

(51) Int. Cl.

| | | |
|---|---|---|
| *H04W 72/08* | (2009.01) | |
| *H04W 4/46* | (2018.01) | |
| *H04W 76/14* | (2018.01) | |
| *H04W 8/00* | (2009.01) | |
| *H04W 56/00* | (2009.01) | |

(52) U.S. Cl.
CPC ....... *H04W 56/001* (2013.01); *H04W 72/048* (2013.01); *H04W 72/085* (2013.01); *H04W 76/14* (2018.02); *H04W 72/0446* (2013.01); *H04W 72/0453* (2013.01); *H04W 72/08* (2013.01)

(56) References Cited

U.S. PATENT DOCUMENTS

| | | | | |
|---|---|---|---|---|
| 2015/0271861 A1* | 9/2015 | Li | ................ | H04W 56/001 455/426.1 |
| 2015/0334760 A1* | 11/2015 | Sartori | ............... | H04W 72/085 370/329 |
| 2016/0044665 A1 | 2/2016 | Novlan | | |
| 2016/0044668 A1* | 2/2016 | Yoon | ................ | H04W 72/0446 370/280 |
| 2016/0044729 A1 | 2/2016 | Tu et al. | | |
| 2016/0174122 A1* | 6/2016 | Sorrentino | ........... | H04B 1/3822 370/331 |
| 2016/0212596 A1* | 7/2016 | Brahmi | ............ | H04W 72/0406 |
| 2016/0249377 A1* | 8/2016 | Jin | ........................ | H04W 24/10 |
| 2016/0330728 A1* | 11/2016 | Sorrentino | .......... | H04W 72/048 |
| 2017/0019887 A1* | 1/2017 | Jiang | .................. | H04W 72/042 |
| 2017/0027015 A1* | 1/2017 | Wijesinghe | ......... | H04W 72/042 |
| 2017/0118741 A1* | 4/2017 | Jung | .................... | H04W 8/005 |
| 2018/0041888 A1* | 2/2018 | Zhu | ....................... | H04W 8/005 |
| 2018/0063825 A1* | 3/2018 | Van Phan | ......... | H04W 52/0216 |
| 2018/0103490 A1* | 4/2018 | Li | ........................ | H04W 88/02 |

OTHER PUBLICATIONS

"International Search Report", International Patent Application No. PCT/2016/045724, dated Feb. 16, 2017, 15 pages.

Wu, Wenbin, et al., "Dedicated resource allocation for D2D communications in cellular systems employing FFR", 2014 Sixth International Conference on Wireless Communications and Signal Processing (WCSP), IEEE, Oct. 23, 2014, 6 pages.

* cited by examiner

METHODS, APPARATUS AND SYSTEMS FOR REALIZING VEHICLE TO VEHICLE COMMUNICATIONS USING LONG TERM EVOLUTION DEVICE TO DEVICE COMMUNICATIONS

CROSS REFERENCE TO RELATED APPLICATIONS

This application is a National Stage Application filed under 35 U.S.C. 371 of International Application No. PCT/US16/45724, filed Aug. 5, 2016 and claims the benefit of U.S. Provisional Application No. 62/204,297 filed Aug. 12, 2015, U.S. Provisional Application No. 62/222,580 filed Sep. 23, 2015 and U.S. Provisional Application 62/251,013 filed Nov. 4, 2015, the contents of each of which are incorporated by reference herein.

FIELD

The present invention relates to the field of wireless communications and, more particularly, to methods, apparatus and systems for realizing Vehicle-to-Vehicle (V2V) communications using Long Term Evolution (LTE) Device-to-Device (D2D) systems, methods, and apparatuses associated with a mobile device and wireless communications. The mobile device may perform wireless communication and/or other smartphone processes and applications.

BACKGROUND

Vehicle-to-Vehicle (V2V) communications may be provided by existing and yet to be developed vehicular systems that are being researched. Direct Device-to-Device (D2D) communications has gained interest recently as major standardization bodies like IEEE or 3GPP have defined or are in the process of defining specifications to support D2D. D2D communication may be any of used, deployed, designed, integrated, etc., with V2V communications and/or vehicular networks. Vehicular networks may include two types of nodes: (1) vehicles and (2) roadside stations, any of which may be dedicated short-range communications (DSRC) devices.

In July 2015, 3GPP approved a study item for Vehicle-to-X (V2X) communications. The study item addresses the current LTE specifications and achieving V2V communications using the existing D2D (e.g., ProSe) framework. However, using D2D communications and/or D2D discovery for V2V communications may pose one or more problems.

SUMMARY

Methods, apparatuses, and systems for a User Equipment (UE) device executing communications using a Device-to-Device (D2D) Long Term Evolution (LTE) network are provided. A representative method includes determining other UE D2D devices communicating in an area, determining whether D2D data is to be transmitted, determining one or more resource sets for transmitting the D2D data, and transmitting the D2D data using the determined one or more resource sets.

A representative apparatus includes a UE device configured to execute V2V communications using a D2D LTE network, and the UE includes a processor configured to (1) determine other UE D2D devices communicating in an area, (2) determine whether D2D data is to be transmitted, and (3) determine one or more resource sets for transmitting the D2D data, and a transmitter configured to transmit the D2D data using the determined one or more resource sets.

A representative method includes determining other UE D2D devices communicating in an area, determining whether D2D data is to be transmitted, determining one or more resource sets for transmitting the D2D data that are different than a current one or more resource sets allocated for executing communications using the D2D LTE network, and transmitting the D2D data using the determined one or more resource sets.

A representative method for a UE operating on a D2D LTE network to perform V2V communications across multiple networks includes determining whether the UE is out-of-coverage of the UE's home Public Land Mobile Network (PLMN), selecting a resource set for transmitting D2D data when the UE is out-of-coverage, and transmitting the D2D data according to the selected resource set, wherein the selected resource set corresponds to a dedicated V2V frequency used by more than one PLMN.

A representative method for a UE performing communications between different networks of V2V communications using a D2D LTE network includes determining that a specific V2V service is used to transmit the D2D data, selecting one of a Home PLMN or a PLMN providing a dedicated carrier corresponding to the specific V2V service, and transmitting the D2D data using the selected one of the Home PLMN or the PLMN providing the dedicated carrier.

A representative apparatus includes a UE device configured to execute V2V communications using a D2D LTE network, and the UE includes a processor configured to (1) determine other UE D2D devices communicating in an area, (2) determine whether D2D data is to be transmitted, and (3) determine one or more resource sets for transmitting the D2D data that are different than a current one or more resource sets allocated for executing communications using the D2D LTE network, and a transmitter configured to transmit the D2D data using the determined one or more resource sets.

A representative apparatus includes a UE configured to operate on a D2D LTE network to perform V2V communications across multiple networks, and the UE includes a processor configured to (1) determine whether the UE is out-of-coverage of the UE's home PLMN, and (2) select a resource set for transmitting D2D data when the UE is out-of-coverage, and a transmitter configured to transmit the D2D data according to the selected resource set, wherein the selected resource set corresponds to a dedicated V2V frequency used by more than one PLMN.

A representative apparatus includes a UE configured to perform communications between different networks of V2V communications using a D2D LTE network, and the UE includes a processor configured to (1) determine that a specific V2V service is used to transmit the D2D data, and (2) select one of a Home PLMN or a PLMN providing a dedicated carrier corresponding to the specific V2V service, and a transmitter configured to transmit the D2D data using the selected one of the Home PLMN or the PLMN providing the dedicated carrier.

BRIEF DESCRIPTION OF THE DRAWINGS

A more detailed understanding may be had from the Detailed Description below, given by way of example in conjunction with drawings appended hereto. Figures in such drawings, like the detailed description, are examples. As such, the Figures and the detailed description are not to be considered limiting, and other equally effective examples are possible and likely.

Furthermore, like reference numerals in the figures indicate like elements, and wherein.

DETAILED DESCRIPTION

A detailed description of illustrative embodiments may now be described with reference to the figures. However, while the present invention may be described in connection with representative embodiments, it is not limited thereto and it is to be understood that other embodiments may be used or modifications and additions may be made to the described embodiments for performing the same function of the present invention without deviating therefrom.

Although the representative embodiments are generally shown hereafter using wireless network architectures, any number of different network architectures may be used including networks with wired components and/or wireless components, for example.

Figure 1:
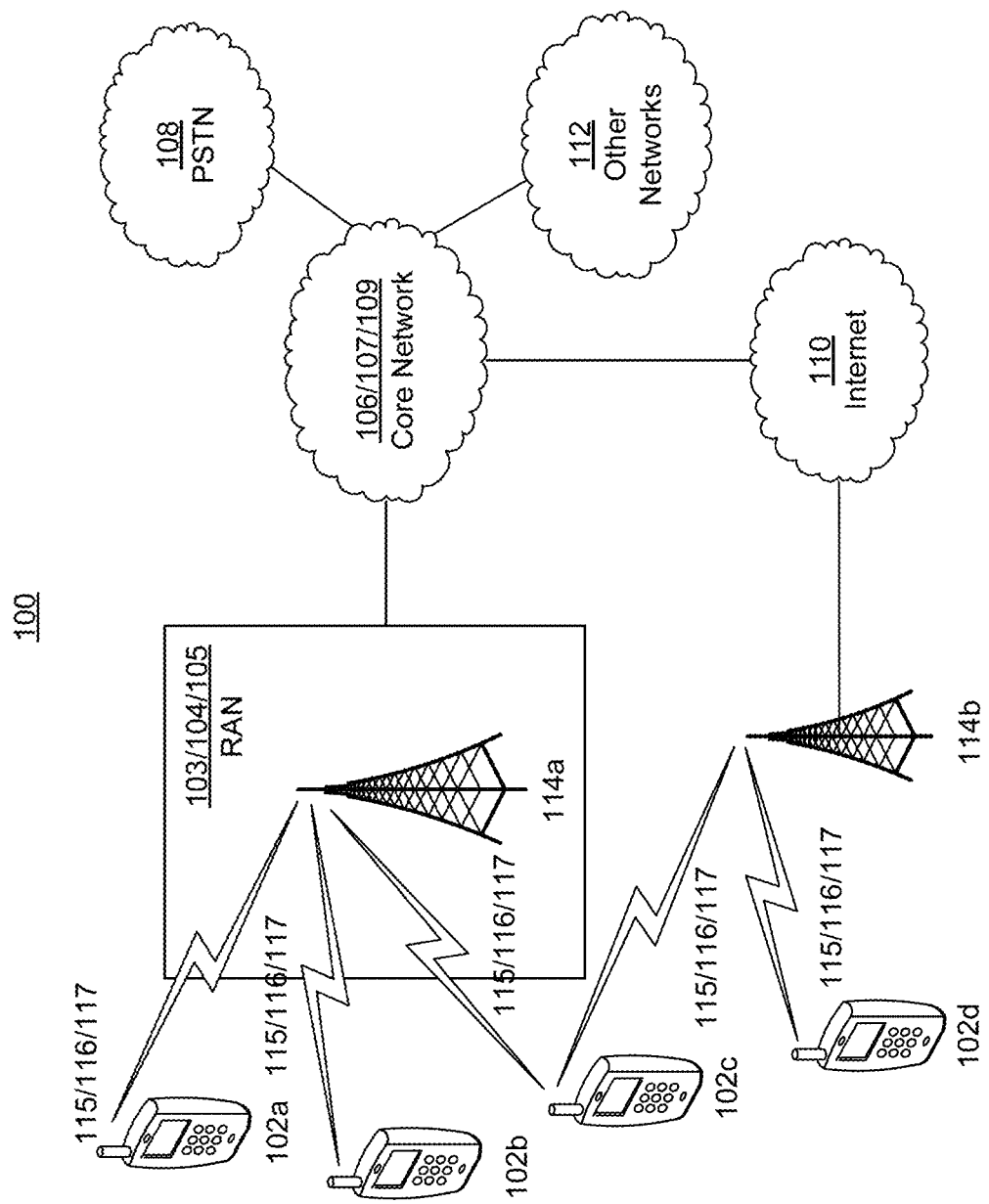
FIG. 1 is a system diagram illustrating an example communications system in which one or more disclosed embodiments may be implemented.

FIG. 1 is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1, the communications system 100 may include wireless transmit/receive units (WTRUs) 102a, 102b, 102c, 102d, a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like.

For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1 may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM, UMTS, CDMA 2000, WiMAX, or WiFi radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1 may be configured to communicate with the base station 114a, which may employ a cellular-based radio technology, and with the base station 114b, which may employ an IEEE 802 radio technology.

Figure 2:
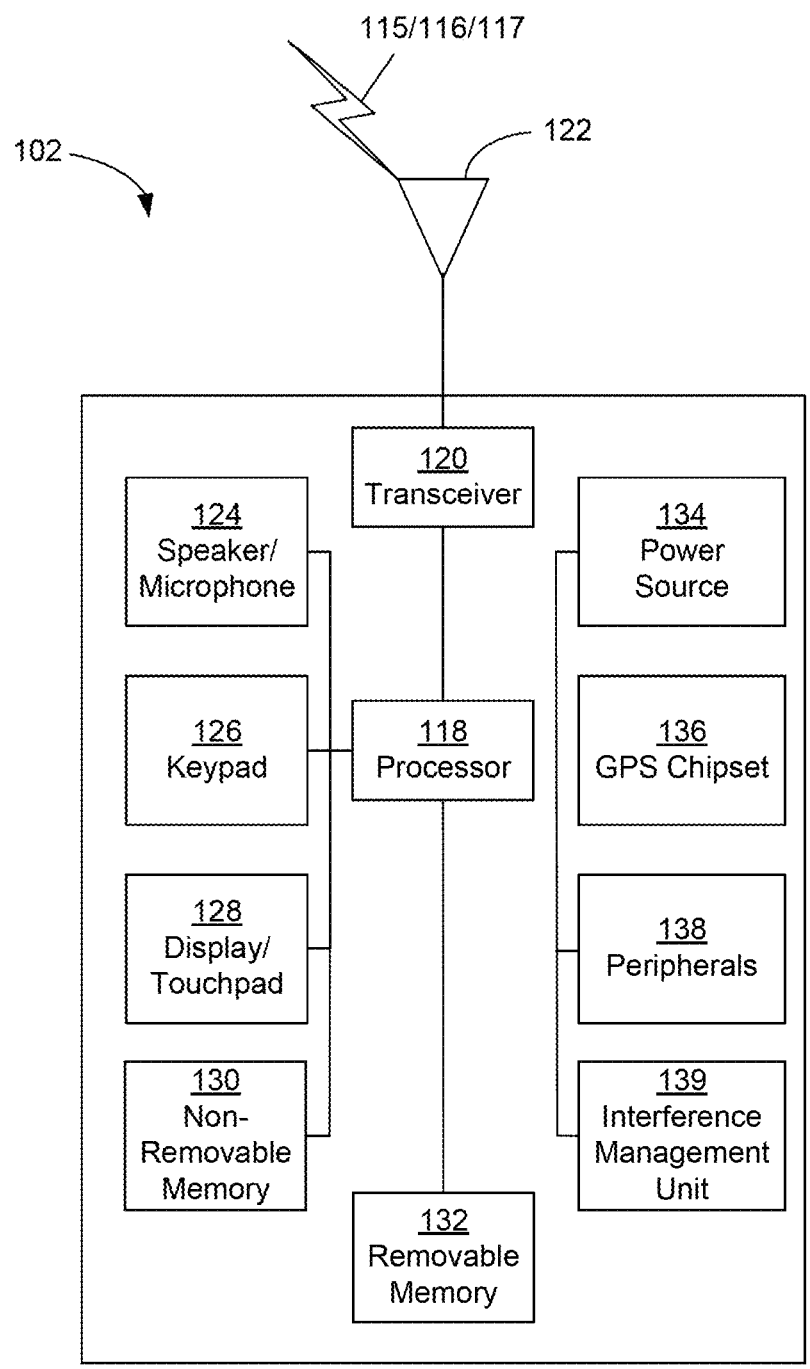
FIG. 2 is a system diagram illustrating an example wireless transmit/receive unit (WTRU) that may be used within the communications system illustrated in FIG. 1 according to an embodiment.

FIG. 2 is a system diagram illustrating an example WTRU 102. As shown in FIG. 2, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 2 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 2 as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, and the like. In a case where the peripherals 138 includes one or more sensors, the sensors may be one or more of a gyroscope, an accelerometer; an orientation sensor, a proximity sensor, a temperature sensor, a time sensor; a geolocation sensor; an altimeter, a light sensor, a touch sensor, a magnetometer, a barometer, a gesture sensor, and/or a humidity sensor.

The WTRU 102 may include a full duplex radio for which transmission and reception of some or all of the signals (e.g., associated with particular subframes for both the UL (e.g., for transmission) and downlink (e.g. for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118).

Figure 3:
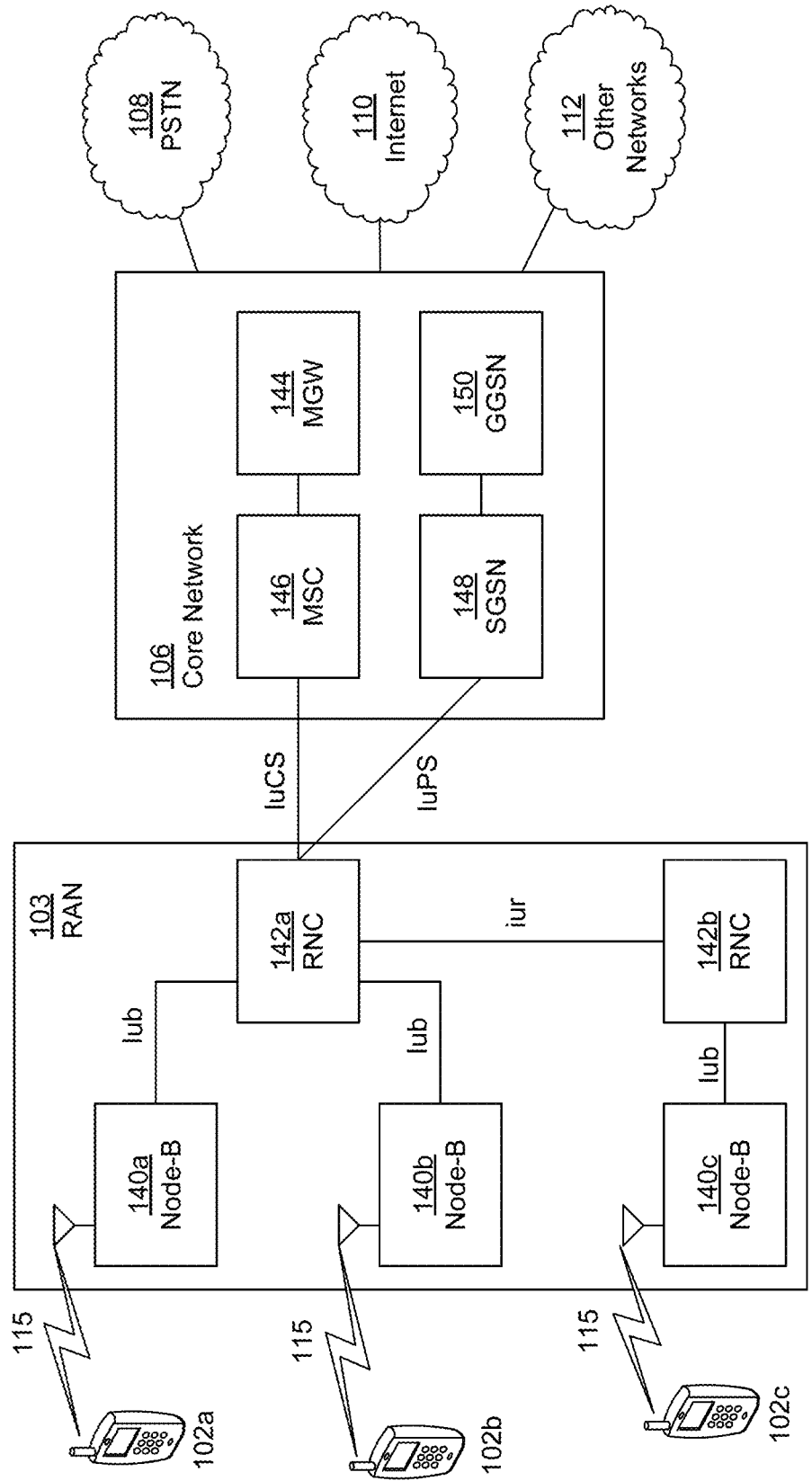
FIG. 3 is a system diagram illustrating an example radio access network and another example core network that may be used within the communications system illustrated in FIG. 1 according to an embodiment.

FIG. 3 is a system diagram illustrating the RAN 103 and the core network 106 according to another embodiment. As noted above, the RAN 103 may employ a UTRA radio technology to communicate with the WTRUs 102a, 102b, 102c over the air interface 115. The RAN 103 may also be in communication with the core network 106. As shown in FIG. 3, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 3, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 3 may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the other networks 112, which may include other wired and/or wireless networks that are owned and/or operated by other service providers.

Figure 4:
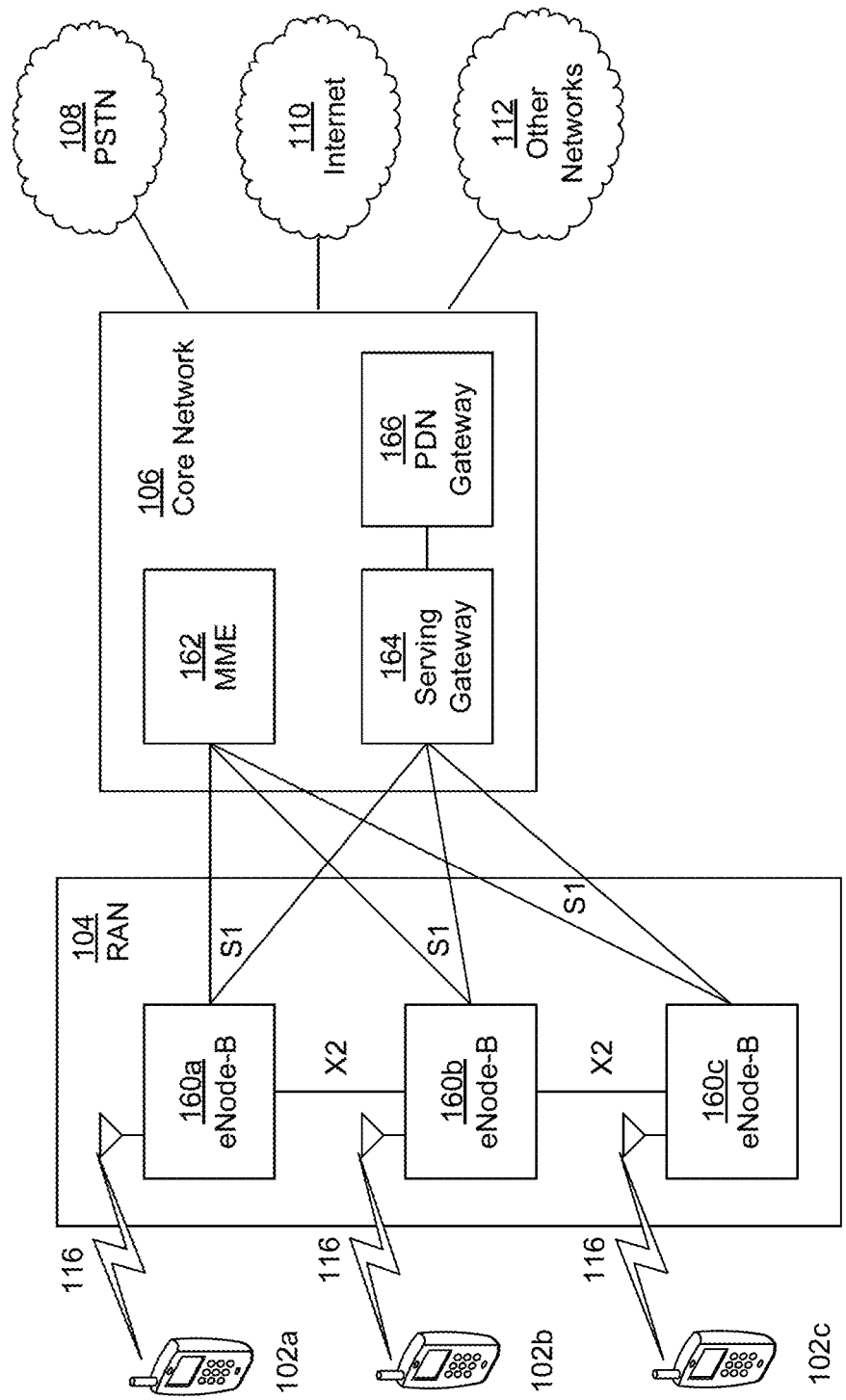
FIG. 4 is a system diagram illustrating another example radio access network and another example core network that may be used within the communications system illustrated in FIG. 1 according to an embodiment.

FIG. 4 is a system diagram illustrating the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 4, the eNode-Bs 160a, 160b, 160c may communicate with one another over an X2 interface.

The core network 107 shown in FIG. 4 may include a mobility management entity (MME) 162, a serving gateway (SGW) 164, and a packet data network (PDN) gateway (or PGW) 166. While each of the foregoing elements are depicted as part of the core network 107, it will be appreciated that any of these elements may be owned and/or operated by an entity other than the core network operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The serving gateway 164 may be connected to each of the eNode Bs 160a, 160b, 160c in the RAN 104 via the S1 interface. The serving gateway 164 may generally route and forward user data packets to/from the WTRUs 102a, 102b, 102c. The serving gateway 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The serving gateway 164 may be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the other networks 112, which may include other wired and/or wireless networks that are owned and/or operated by other service providers.

Figure 5:
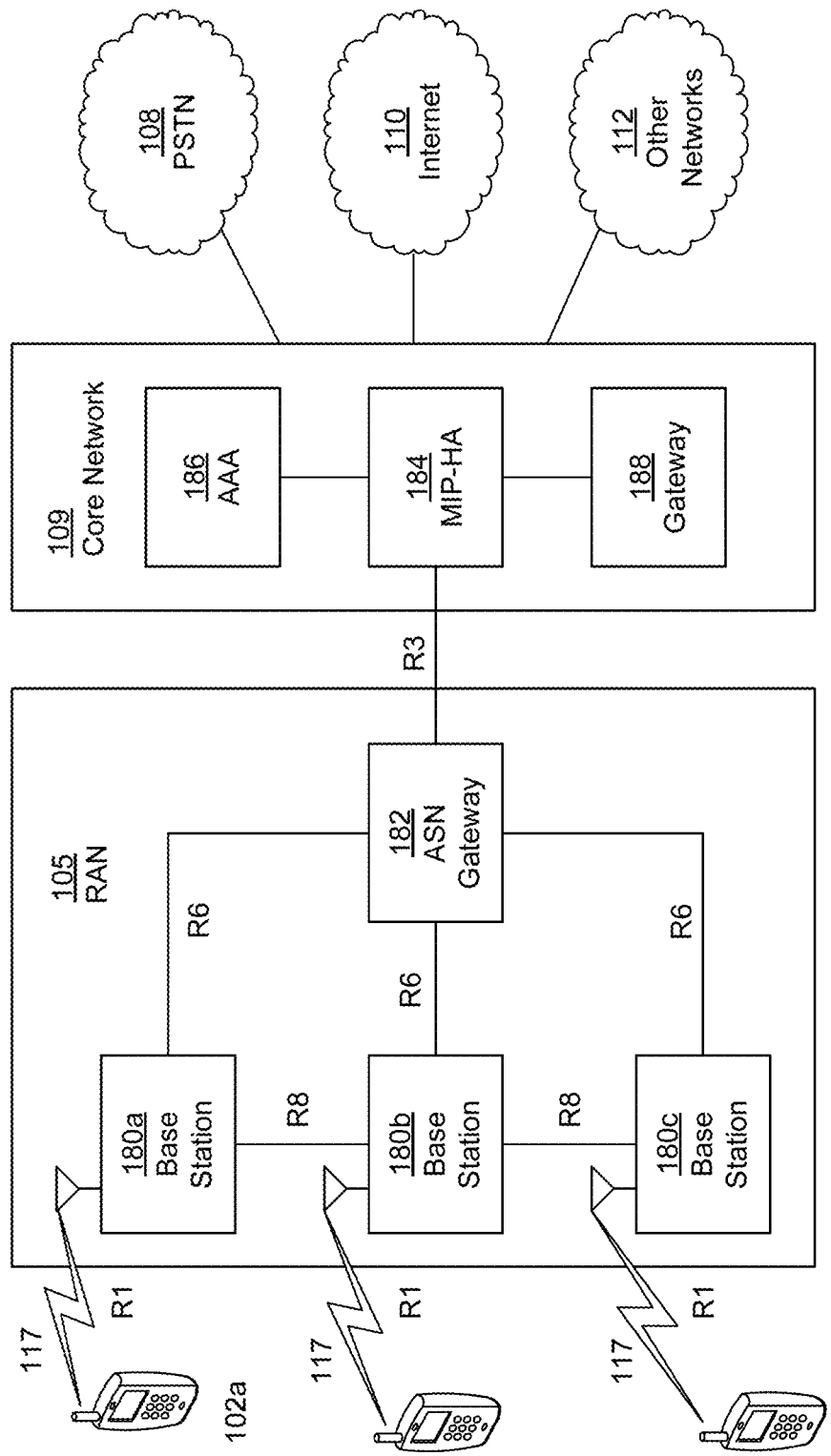
FIG. 5 is a system diagram illustrating a further example radio access network and a further example core network that may be used within the communications system illustrated in FIG. 1 according to an embodiment.

FIG. 5 is a system diagram illustrating the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 5, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. The base station 180a, for example, may use multiple antennas to transmit wireless signals to, and/or receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 100c.

As shown in FIG. 5, the RAN 105 may be connected to the core network 109. The communication link between the RAN 105 and the core network 109 may be defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any of these elements may be owned and/or operated by an entity other than the core network operator.

The MIP-HA 184 may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. The gateway 188 may provide the WTRUs 102a, 102b, 102c with access to the other networks 112, which may include other wired and/or wireless networks that are owned and/or operated by other service providers.

Although not shown in FIG. 5, it will be appreciated that the RAN 105 may be connected to other ASNs, other RANS (e.g., RANs 103 and/or 104) and/or the core network 109 may be connected to other core networks (e.g., core network 106 and/or 107. The communication link between the RAN 105 and the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Although the WTRU is described in FIGS. 1-5 as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent 20 MHz channel to form a 40 MHz wide contiguous channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz.

In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

According to embodiments, vehicular communication systems, which may be referred to as vehicular networks, may be a communication network in which vehicles and roadside units are the communicating nodes, providing each other with information, such as safety warnings and traffic information. For example, according to certain embodiments, a vehicular communication system may be implemented as one of or any full or partial combination of communication systems and apparatus embodiments illustrated in FIGS. 1-5. For example, a user equipment, a network equipment, a vehicle, a roadside unit, or any other element of the vehicle communication system may be and/or may include any one or more of the WTRUs 102*a*, 102*b*, 102*c*, 102*d*, the elements included in the RAN 103/104/105 and/or any other suitable and/or similar element illustrated in FIGS. 1-5.

According to embodiments, a cooperative approach for vehicular communication systems may be more effective for avoiding accidents and traffic congestions than if each vehicle tries to solve these problems respectively. According to embodiments discussed below, methods of performing Device-to-Device (D2D) communications, including procedures for achieving reliability in Vehicle-to-X (V2X) communications and procedures for resource selection for D2D communications are presented. For example, a vehicle operating in a cooperative approach, which may be referred to as an infrastructure mode, which uses the vehicular communications systems and/or vehicular networks may be more effective in addressing vehicular and traffic system problems than a vehicle operating in an autonomous mode, wherein the autonomous mode may not use the vehicular communications systems and/or vehicular networks to solve the above noted problems.

Vehicular networks, which may include any one or more of the UEs and other network devices illustrated in FIGS. 1-5, may include nodes such as, for example, vehicles and roadside stations. Such nodes may be Dedicated Short-Range Communications (DSRC) devices and may operate in a 5.9 GHz band with bandwidth of 75 MHz and an approximate range of 1000m. However, the present disclosure is not limited thereto, and the vehicular networks may operate in or on any suitable and/or similar radio communication interface and may include any suitable type of nodes.

In July 2015, 3$^{rd}$ Generation Partnership Project (3GPP) approved a study item for Vehicle-to-X (V2X) communications regarding a standard for vehicular communications, including both Vehicle-to-Vehicle (V2V), Vehicle-to-Infrastructure (V2I), and Vehicle-to-Passenger (V2P), in addition to DSRC. The study item adapts current Long Term Evolution (LTE) specifications for V2X communications. For example, as a first phase of the study item, V2V communications using an existing Device-to-Device (D2D) framework, such as a ProSe framework, is to be considered.

V2X communications requirements have been developed in 3GPP by SA1 TR22.885 v0.2.0 (2015-04) Study on LTE Support for V2X Services (R14), which is incorporated by reference herein. Specifically, these V2X communications requirements call for transmission of short messages (for example, on the order of fifty to several hundred bytes), with high reliability at an Access Stratum (AS) level/layer (for example, a reliability up to 90%), and with low latency (for example, as small as 100 ms), in order to support specific use cases such as, for example, forward collision warning, control loss warning, emergency stops, and/or to support any other similar and/or suitable use cases.

In the case of 3GPP and LTE based radio access, support for D2D communications may be introduced to allow for cost-efficient and high-capability Public Safety (PS) communications using LTE technology. 3GPP and LTE support for D2D communications may harmonize radio access technologies across jurisdictions in order to lower capital and operating expenditures of radio-access technology available for the use of PS types of applications. 3GPP and LTE support for D2D communications may also achieve a scalable wideband radio solution allowing for efficient multiplexing of different services types, such as, for example, data, voice and video.

PS applications may need to perform radio communications in cases, conditions, and/or areas that may be not be under radio coverage of an LTE network, e.g. in tunnels, in deep basements, high interference areas, remote areas, following catastrophic system outages, and/or in any other similar and/or suitable case, condition, area, etc., that may be subject to poor or no radio coverage. In such cases, areas, and/or similar cases and/or areas wherein a D2D device is not under radio coverage, there may be a need to support D2D communications for PS in the absence of any operating network or prior to the arrival of AdHoc deployed radio infrastructure. However, even when operating in the presence of operating network infrastructure, i.e., in a case where a D2D device is under radio coverage, PS communications may yet need higher reliability communication services than available to commercial communication services, e.g., higher than that available via the operating network infrastructure.

PS type of applications, (e.g., applications, such as communication and/or information applications for public safety operations, activities, emergencies, etc., which may be used by PS officers, agents, emergency personnel, first responders, safety personnel, etc.) may include direct push-to-talk speech services using multiple talk groups. Additionally, according to an embodiment, PS type of applications may include services such as video push or download to make efficient use of capabilities that LTE broadband radio provides. However, the present disclosure is not limited thereto, and PS type applications may include any suitable and/or similar services that may be used for PS operations, activities, and/or emergencies.

According to an embodiment, D2D communications may be available for PS type applications, for commercial applications, and/or other use cases and/or applications in addition to PS types of applications. For example, utility companies may need to support two-way radio communications in areas not covered by network infrastructure. Furthermore, D2D services, such as D2D Discovery, may be suitable signaling mechanisms to allow for proximity-based services and traffic offload using LTE-based radio access in commercial use cases. However, the present disclosure is not limited thereto, and D2D communications and/or services discussed herein may be applied to any suitable and/or similar application and/or use case.

In LTE systems, access control and priority handling mechanisms may arbitrate, determine, and/or provide access to and usage of wireless resources by terminals, such as D2D devices and/or vehicles.

According to embodiments, System Information Broadcast (SIB) messages carried on a Broadcast Channel (BCH) may carry information regarding access service classes of terminals that are allowed to connect. For example, the SIB messages may carry information regarding access service classes such as emergency only, maintenance only, or any other similar and/or suitable type of access service class. Beyond initial access to an LTE cell, access control may be provided after a terminal device is connected to an LTE cell. For example, in a case where more terminals than can reliably be supported are connected to a cell, Access Stratum (AS) or Non-Access Stratum (NAS) connections from a network side may be terminated and/or terminals may be re-directed to channels or frequency bands of other radio access technologies, such as, for example, Global System for Mobile Communications (GSM), and $3^{rd}$ Generation (3G) High Speed Packet Access (HSPA), in an operator's network.

Access control in LTE networks may be provided according to several methods. These methods may share a common feature that a network may deny or limit a terminal's access to wireless resources prior to the terminal's connection attempt or while the terminal is connected to one or more cells. Such LTE systems may also provide priority handling of wireless services that may be running and/or executed concurrently. In many cases, priority handling may be used to ensure data streams needing higher QoS, such as, for example, conversational voice and/or video data streams, and/or data including control signaling, may be served first and/or with guaranteed bit rates and/or guaranteed latencies.

For example, in LTE systems, in a case of priority handling of data with multiple users in a LTE network, a base station (e.g., a base station illustrated in any one of FIGS. 1-5) may first schedule high-priority data with real-time QoS constraints in the Downlink (DL). Furthermore, in the case of priority handling of data with multiple users, the base station may reduce and throttle service data rates for lower priority download types of data. Similarly, communication systems, when supporting emergency calls, may implement priority handling for E911 calls in order to provide and/or guarantee higher successful call setup percentages and lower occurrences of dropped calls as compared to that which may be provided and/or guaranteed for regular voice calls. Similarly, in a case where a single terminal device has multiple types of data to transmit concurrently, rules instructing that higher priority data (e.g., data associated with higher logical channel priority) be transmitted first may be applied when an UL transmission opportunity has been granted. In such a case, transmission of lower priority data may be completed once packets allocated higher logical channel priorities have completed their transmission.

Priority handling from a single user perspective and from a system perspective may be implemented in different methods in LTE systems, as discussed above. These different methods may share a common feature in that higher priority data may be transmitted first, and transmission of lower priority data may be pre-empted in a case where concurrent services need to be supported, for example, in a case of concurrent transmissions.

For Release 13 (Rel13) of 3GPP LTE, priority handling is currently being standardized, wherein priority handling may be performed on a per-packet priority scheme that includes an application layer sending packets to an AS along with a priority value from among a plurality of different priority values. This priority value may indicate a level of priority according to which the AS should treat, or in other words, process, the packet. Further details of how priority is ensured by the AS may be further discussed and developed.

According to embodiments, D2D communications using LTE based radio access, such as that described above with reference to some of FIGS. 1-5, may operate in network-control mode, which may be referred to as a Mode 1, and in User Equipment (UE) autonomous mode, which may be referred to as Mode 2. Mode 1, which is a network controlled mode, may be executed and/or operate under certain conditions in a case where the D2D terminal is in radio range of a LTE base station. The D2D terminal may fall back to, or in other words, may execute and/or operate in, Mode 2 in a case where the UE is not communicating with the LTE base station. In the case executing and/or operating Mode 2, the UE may use channel access parameters that may be pre-stored on and/or provided to the UE.

In the case of D2D communications using Mode 1, the LTE base station may reserve a selected set of UL subframes for (e.g., to allow for and/or provide) D2D transmissions. The LTE base station may also announce and/or broadcast a set of UL subframes with associated parameters in which D2D communications for neighboring cells and/or Mode 2 terminals may be received. However, less than all of an LTE system's bandwidth (BW) may be available for D2D transmissions in a subframe reserved for D2D. When operating in Mode 1, radio resources for D2D communications may be granted to a D2D terminal by the serving cell, and for example, may be indicated to the UE using a D2D grant. The D2D grant from the network may be preceded by and/or may be a result of an Uplink (UL) transmission. For example, the D2D grant may be in response to an cellular UL transmission by the UE indicating to the base station an amount of available D2D data and/or an amount of D2D data to be transmitted. The D2D grant received by the D2D terminal from the LTE base station on the cellular DL may allow the D2D terminal to use certain and/or selected radio resources, e.g., certain and/or selected resource blocks (RBs) occurring in subframes over (e.g., during) a certain scheduling period.

The D2D terminal may transmit a Scheduling Assignment (SA) message in a first set of one or more D2D subframes. The D2D terminal may transmit the D2D data in a second set of one or more D2D subframes of a scheduling period. A SA (e.g., an SA message) may include any of an identifier field, an MCS field, a resource indicator, and a Timing Advance (TA) field, amongst other fields. D2D data packets may include a MAC header with source and/or destination addresses, amongst other fields. A UE, which may be a D2D terminal, may multiplex multiple logical channels and send the multiplexed channels as part of a single Transport Block (TB) in a given D2D subframe.

For D2D communications using Mode 2, the D2D terminals may autonomously select time/frequency radio resources. Channel access parameters, such as, for example, information related to the subframes for transmissions of SA control messages and corresponding D2D data, scheduling periods, and/or monitoring subframes, may be pre-configured and/or stored on the D2D terminal. Additionally, Mode 2 terminals may follow a same and/or similar transmission behavior as the Mode 1 terminals. For example, the Mode 2 terminals may also transmit SAs followed by D2D data in scheduling periods, and may do such with respect to a UL traffic volume indication and a downlink (DL) D2D grant phase. For D2D communications performed according to either of Mode 1 and Mode 2, D2D terminals may transmit auxiliary D2D signals, such as, for example, D2D synchronization signals and channel messages, and any other similar and/or suitable message and/or information, to aid receivers in demodulating received data.

D2D communications using LTE based radio access may carry voice channels, data packets, data streams, and/or any other similar and/or suitable information. A D2D discovery service may be considered to be a special case of D2D communications. For example, D2D discovery may use, transmit, and/or receive (e.g., may only use, only transmit, and/or only receive) small packet transmissions that may fit in one, two, or a few subframes. For example, transmissions of a small number of packets may contain application data announcing availability of devices and/or SW applications to participate in D2D data exchanges with nearby and/or neighboring terminals.

D2D discovery may use the same and/or a different channel access protocol used for D2D communications for voice (e.g., voice data), or D2D data, such as, for example, user data, application data, and/or any other similar and/or suitable type of data and/or information. In a case of D2D discovery service occurring while a D2D device is in coverage of an LTE base station, D2D discovery resources may be allocated separately from resources used for D2D communications related to voice and/or D2D data. D2D terminals may autonomously select radio resources for D2D discovery messages from among a set of radio resources reserved by the eNB and periodically recurring time-frequency radio resources in certain UL subframes. Autonomous selection of radio resources may be referred to as Type 1 discovery. In a case of Type 2 discovery, radio resources for D2D discovery may be explicitly allocated (e.g., assigned, signaled, broadcast, pre-determined, etc.) by the LTE serving cell to the D2D terminals. Type 2 discovery may be similar to D2D communications Mode 1, wherein transmissions of SAs may be unnecessary when transmitting D2D discovery messages. However, in a case of D2D terminals only transmitting D2D discovery messages, e.g., D2D terminals that are not transmitting SAs, such D2D terminals may need to transmit auxiliary D2D synchronization signals to assist receivers.

According to an embodiment, LTE D2D systems, methods and apparatuses may be used for V2X communications. For example, LTE D2D systems may be used for V2V and V2I communications, and/or for any other similar and/or suitable communications including and/or related to vehicles. However, utilizing D2D communications and/or D2D discovery for V2V communications may pose several issues to be addressed. For example, V2V communications requirements may include a requirement for high reliability communications. However, D2D communications systems may be based on contention based access. For example, in a case of out-of-coverage D2D devices and/or terminals, each transmitting UE may determine and/or select its own resources and may transmit on a scheduling period based on these selected resources. Such resources may be referred to as Time Resource Pattern of Transmission (TRPT) resources. In a case where a transmitting UE (e.g., each transmitting UE) may determine and/or select its own resources, transmission collisions may occur. Such collisions may be only partially accounted for with non-feedback based HARQ repetitions, and/or other similar and/or suitable HARQ based systems for mitigating the collisions. With the adoption of widespread V2X communications, the number of D2D UEs (e.g., vehicles) in an area (e.g., a small area) may result in a larger number of resource collisions than expected with regular D2D. The larger number of resource collisions may make it difficult (e.g., impossible) to achieve the V2X communication reliability requirements.

Another issue of D2D communications and/or D2D discovery, when used in V2X communications, is that communication between UEs that belong to different networks may not be allowed. For example, in a case where a UE is out of coverage, the UE may be pre-programmed with a specific carrier or frequency corresponding to carriers employed by a specific Public Land Mobile Network (PLMN) or service provider. However, there may be no provisions allowing UEs belonging to different PLMNs to communicate with each other (e.g., to communicate using D2D communications). Yet, according to embodiments of the present disclosure, in the case of V2V and/or V2X communications, different vehicles and network apparatuses may need to communicate with each other, regardless of the provider or network.

In order to address the above noted issues of D2D communications and/or D2D discovery when used in V2X communications, solutions to a number of related problems introduced above are discussed below. As used herein, the term 'D2D data' may refer to any type of D2D related communication between D2D terminals, such as vehicles and/or mobile phones. For example, without a loss of generality, D2D data may include any of: data packets carrying voice data or segments thereof, IP packets or segments thereof (such as, for example, a segment used for file download or upload, streaming or bi-directional video), D2D control signaling, and/or D2D discovery, D2D service, D2D availability messages, and/or any other similar and/or suitable type of data. Furthermore, the solutions discussed herein are described in the general context of the 3GPP D2D communications features. However, the present disclosure is not limited thereto, and any one or more of the concepts, methods, systems, apparatuses, and/or solutions may be applicable to other features, such as D2D discovery, and/or other wireless communications systems, for example.

The term "UE", as used herein, may represent any of: a single D2D-enabled device (e.g., one or more of a mobile device, such as, for example, a mobile phone and/or a mobile computing device), a vehicle which has D2D communication capabilities, and/or a roadside unit of the V2X system. The term "eNB", as used herein, may represent an eNB employed in LTE infrastructure communication so as to provide communication services for in-coverage D2D communications. Such an eNB may be deployed on a cellular tower and/or may be deployed as a road-side unit. In a case where the eNB is deployed as a road-side unit, the eNB may be limited (e.g., functionally and/or operationally limited) to only D2D communication.

Methods for Improving D2D Reliability

According to embodiments, several methods for improving D2D reliability are discussed below. The methods discussed below may be used individually, in combination, and/or by combining parts of any of the methods. The methods for improving D2D reliability, as discussed below, include traffic differentiation, D2D resource reservation, adaptive D2D resource reservation, relaying of high-reliability data, and multicarrier D2D transmissions.

Differentiation of Traffic

According to embodiments, V2V traffic may be differentiated, or in other words, may be characterized by a differentiation of traffic. D2D traffic may need high reliability and low latency to support use cases, such as, for example, collision warning and/or other emergency and/or high-priority information and services. According to embodiments, other use cases may not require such strict latency requirements, and reliability may be achieved by the application layer or higher layer protocols. The solutions described in this disclosure may apply to high reliability traffic. For example, the application layer may signal, to the lower layers, that a specific message or V2V transmission should be treated, processed, and/or handled with respect to high reliability requirements.

According to certain embodiments, the solutions described herein may be applied by the AS and corresponding D2D transmission for traffic, or only for traffic, associated with the latency requirement. According to certain embodiments, signaling from the application layer and/or the AS may be tagged with a priority level from among a plurality of priority levels. According to certain embodiments, a latency value may be associated with a message (e.g., with each delivered message) in order to indicate, to the AS, any of a needed, requested, and a required latency of such a message at the AS. For example, the application layer may associate values of 100 ms, 200 ms, 500 ms, 1 second, etc., to each of the messages provided to the AS. According to certain embodiments, the application layer may provide a priority level as per current Rel13 D2D prioritization mechanisms. However, the present disclosure is not limited thereto, and the application layer may provide any suitable and/or similar priority level, indicator, and/or information.

D2D Resource Reservation

According to embodiments, resources may be reserved for any UEs included in a V2X communication system. According to certain embodiments, communication reliability may be achieved by having each of the UEs communicating in an area and/or within a specific communication range use a different resource or different set of resources when performing D2D communications. As used herein, 'resources' may refer to D2D resource pools, SA resources including subframes and resource blocks, D2D data subframes, or TRPT resources.

In a case of a UE transmitting high reliability traffic, the UE may use any of one or a set of TRPT resources, SA resources, resource pools, or a combination thereof. The use of such resources and/or resource pools may depend on the location of the UE and the other UEs within its D2D communication range. According to certain embodiments, resources and/or resource pools may be used such that the resources used by a specific UE are distinct with respect to other UEs in the same communication range. According to certain embodiments, the V2V communication system, which may include the UEs themselves and network infrastructure, may ensure that these resources will be uniquely utilized by the UEs within the communication range, e.g., that the resources used by a specific UE are distinct resources not used by other UEs. As used herein, a "resource set" may refer to a list of resources used by a UE for any given transmission.

According to embodiments, a certain UE may maintain a list of resources and/or resource sets which may be reserved by any specific UE transmitting in the vicinity of the certain UE. The list of resources and/or resource sets may be obtained by any of the mechanisms and methods used in the embodiments described herein, and alternatively or in addition, the UE may maintain its own list of reserved resources and/or resource sets. In a case where the certain UE performs a transmission for a high reliability communication, the UE may utilize its own resource set. In a case where the transmission is not for a high reliability communication, the UE may use its own resource set or the UE may use another resource set and/or any resource or combination of resources other than the UE's own resource set.

According to embodiments, a V2X communications device, such as, for example, a UE and/or any other terminal and/or network apparatus included in a V2X communications network, may broadcast reserved resources used by one or more respective devices in the V2X communications network. According to certain embodiments, a certain UE may periodically and/or at specific time instances broadcast information related to resources and/or a resource set that it (and/or that other UEs) will use (e.g., are reserved) for high priority communications. A UE that receives such broadcasts from the certain UE may then avoid using the resources indicated in broadcasts received from the certain UE and/or any UE that transmitted the broadcast message. According to certain embodiments, resources (e.g. certain resources) may be avoided for a specific period of time that may be distinct from the broadcast time, and the specific period of time may be predefined, such as, for example, based on standards, configured in the UE, based on infrastructure signaling, and/or determined by the application or upper layers. The broadcast message may contain any of the following information elements: a transmit resource pool, SA resources such as n_PUCCH resources, or specific time frequency resources for a SA, data TRPT resources, a UE identifier, and a time period for exclusive use of the resources.

According to embodiments, a broadcast message may be sent by each UE over a D2D Synchronization channel, for example, by using the master information block (MIB), and/or any suitable and/or similar channel that is monitored by all UEs. According to certain embodiments, the broadcast message may be sent using (e.g. based on and/or according to) D2D discovery or D2D communications. The broadcast message may be transmitted at a specific time reserved for transmission of such information, e.g. a special scheduling period, and/or the SA reserved in a special scheduling period. According to certain embodiments, the broadcast message may also be transmitted (e.g., transmitted regularly and/or periodically) by UEs that are not transmitting normal, emergency, and/or any other specific type of vehicular traffic data. The period of transmission may be determined by the UE itself and/or may be based on pre-programmed and/or network communicated rules. The period of transmission may depend on any of the following information: a speed of the UE (e.g., a speed of physical movement of the UE), specific events triggered by messages sent by other UEs or roadside units, measurements of the channel which may indicate an amount of congestion in the area, and congestion measurements sent by nearby roadside units and/or other UEs.

According to embodiments, in a case having a conflict associated with resources (e.g., resource allocation and/or use), there may be a need for resource conflict resolution to provide unique and/or distinct resources in cases of mobility of the UEs relative to each other. For example, a UE may move into an area where the UE discovers that another UE may be using the same resources as the UE that moved. In this case, a set of rules may be defined by which the resource conflict resolution is performed. For example, a UE may behave in any of the ways described below. First, for example, when a UE receives a broadcast message associated with and/or indicating that there is a conflict with the UE's own selected resource set, the UE may change its resource set by randomly selecting a new resource set that does not conflict with any of the resources and/or resource sets that were received by the UE in the last set of broadcast messages. Second, for example, when a UE receives a broadcast message associated with and/or indicating that there is a conflict with its own selected resource set, the UE may initiate a communication with the UE corresponding to the conflict to resolve the conflict through messaging. Third, for example, when a UE receives a broadcast message associated with and/or indicating that there is a conflict with its own selected resource set, the UE may report the conflict to an eNB, and furthermore, the eNB may resolve the conflict through messages to one or more of the conflicting UEs.

According to embodiments, distinct resource sets may be provided by an eNB, a road-side unit, and/or any other similar and/or suitable element of a V2V network. In a case where the eNB or road-side unit may only provide V2V services and/or communications, the UE may be considered out of coverage from a cellular perspective. For example, the UE may be concurrently in-coverage with another eNB while out of coverage with the eNB that is the road-side unit. According to certain embodiments, the distinct resources may be provided by using signaling similar to Mode 1 D2D communications, i.e. via Downlink Control Information (DCI) format 5, or similar signaling, as is the case with a Release 12 (Re112) D2D. However, the eNB may also provide the resource sets in the case of Mode 2 D2D communications and may ensure that the resource sets are distinct. In the case of Mode 2 D2D communications, the eNB may use dedicated cellular signaling (e.g., Radio Resource Control (RRC) signaling), a Media Access Control (MAC) Control Element (CE), and/or other similar information, data, and/or signaling. In the case of a road-side unit that is behaving as a D2D UE, the resources may be provided via low-priority D2D communications, discovery, or via D2D RRC signaling, e.g., a MIB.

According to embodiments, reserved resources may be indicated by a roadside unit. A UE may periodically send a proximity signal and/or message destined to a roadside unit, and, in such a case, the roadside unit may provide distinct resource sets based on the proximity signal. The proximity signal and/or message may contain any of: a UE ID (e.g., a L1 ID, a L2 ID, a Prose ID, or other ID); a list of other UEs detected and/or known by the UE sending the proximity signal and/or message; one or more IDs of other UEs that form a vehicular cooperation group to which the UE is currently joined; vehicle speed, direction, and status; and any other similar and/or suitable information that may be used to determine and/or allocate resources.

According to embodiments, a UE may be a member of a cooperation group, and resources may be reserved based on a UE ID within the cooperation group. According to certain embodiments, resources reserved for a UE for high reliability communications may be reserved based on a cooperation group specific UE ID. For example, a UE may be assigned an ID, which may be unique within the cooperation group, when it joins a cooperation group. The UE may select D2D resources for transmission of high reliability data as a function of the assigned ID. For example, the UE may be assigned a first SA resource index (n_PUCCH) in such a way that it has a one-to-one mapping with the cooperation group specific UE, for example, based on the cooperation group specific UE ID, which may be referred to as the assigned ID. According to certain embodiments, the TRPT resources, which may be used by a UE for high reliability communication, may be a unique function of the ID.

According to embodiments, more than one UE may share a resource set. For example, a single resource set may be reserved (e.g., reserved exclusively) for more than one UE (e.g., a group of UEs) to use for transmission of high reliability data. Each of the more than one UE within the group may transmit within the resource set at distinct periods of time. These time periods, and as a result, specific resources within the resource set that a specific UE may use, may be determined by direct assignment from an eNB and/or roadside unit. The specific resources may be any of: determined implicitly based on information from the application layer, preconfigured within the UE, provided by a roadside unit, or determined by a combination thereof. Reservation of the specific resources and/or the resource set may be performed by any of an eNB, one or more coordinating roadside units, one or more coordinating UEs, or a combination thereof. For example, an eNB and/or a roadside unit may reserve a resource set to be used by a plurality of UEs which are part of a single coordination group. Each UE from among the plurality of UEs may use a time-dependent part of the resource set, e.g., a unit and/or part of the resource set that is identified according to time, where the time unit and/or part may associated with and/or be determined according to information from the application layer, e.g. the UE ID within the cooperation group. Roadside units, eNBs, and/or UEs may coordinate to provide non-overlapping reserved resource sets for coordination groups which are in close proximity.

According to embodiments having more than one UE sharing a resource set, as well as other embodiments, a UE may join a vehicular cooperation group. The vehicular cooperation group may be used for cooperative cruise control or other similar and/or suitable use cases using, relying upon, and/or needing cooperation between more than one vehicle and/or more than one UE and/or eNB. According to embodiments, a set of UEs in close vicinity to each other may be part of a vehicular cooperation group, and a UE may join or leave the vehicular cooperation group. According to certain embodiments, signaling to join, leave, and/or communicate with a vehicular cooperation group may be performed at the application or upper layers, but the AS may be made aware of a current vehicular cooperation group that includes the UE. For example, in a case where a UE joins or leaves (e.g., successfully joins or leaves) a vehicular cooperation group, the UE may inform the AS of the joining and/or leaving of the vehicular cooperation group.

Figure 6:
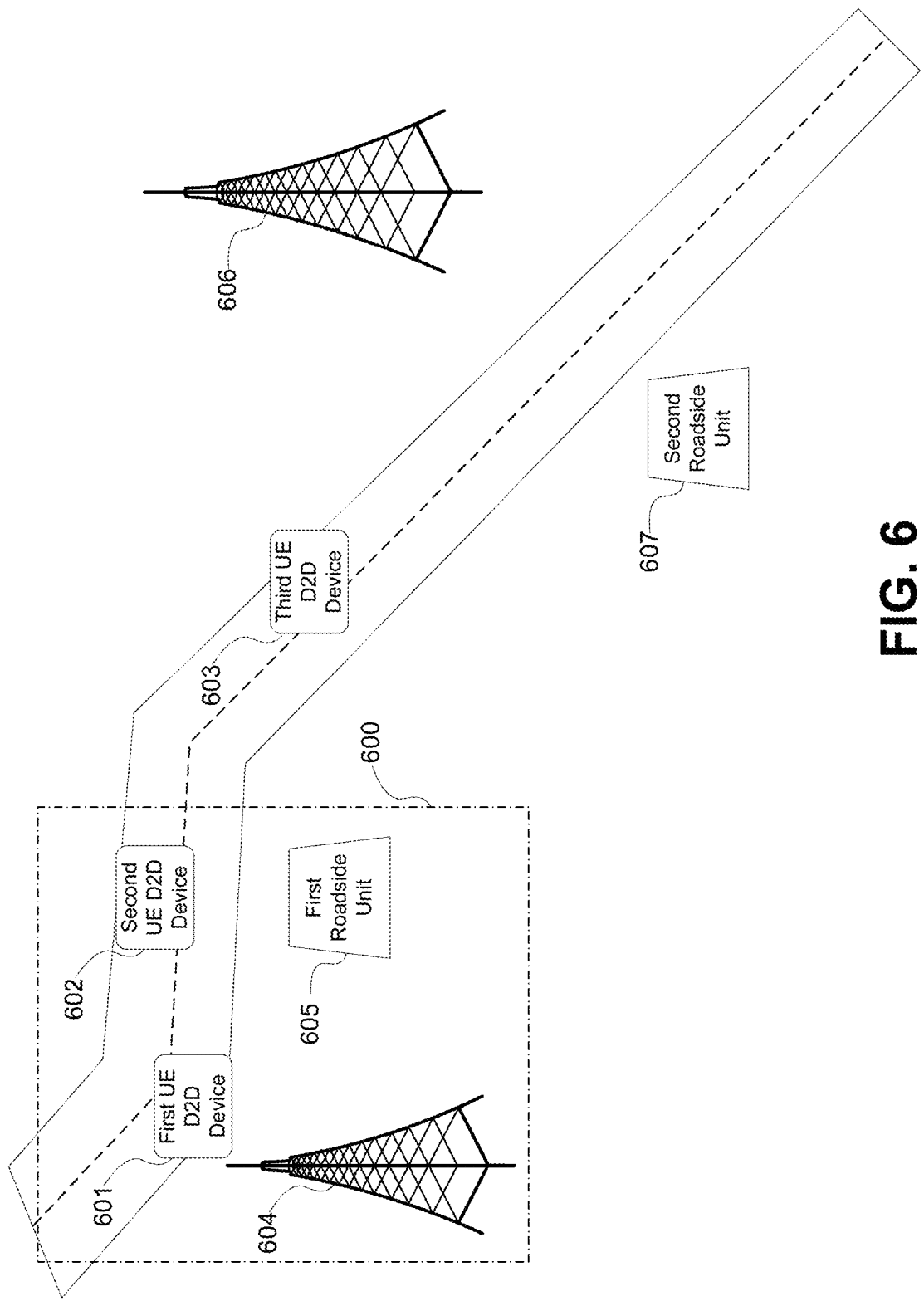
FIG. 6 is a diagram illustrating V2V communications using LTE D2D devices according to an embodiment.

FIG. 6 is a diagram illustrating V2V communications using LTE D2D devices according to an embodiment.

Referring to FIG. 6, a variety of UE D2D devices and/or other D2D devices, some of which may be disposed in vehicles, may be performing V2V communications and may be included in one or more vehicular cooperation groups. For example, a first UE D2D device 601 may be in a vehicular cooperation group 600 along with a second UE D2D device 602. A third UE D2D device 603 may not be a member of any vehicular communication group. Both a first eNB 604 and a first roadside unit 605 may be part of the vehicular cooperation group 600, while a second eNB 606 and a second roadside unit 607 may be not included in any vehicular cooperation group. However, the present disclosure is not limited to that illustrated in FIG. 6, and according to an embodiment, any one or more of the first, second, or third D2D devices 601, 602, 603, the first or second eNBs 604, 606, and the first or second roadside units 605, 607 may join and/or exit the vehicular cooperation group 600 and/or any other vehicular cooperation group, and/or may not join any vehicular cooperation group. Additionally, any one or more of the first, second, or third D2D devices 601, 602, 603, the first or second eNBs 604, 606, and the first or second roadside units 605, 607 may join and/or exit more than one vehicular cooperation group.

Adaptive D2D Resource Selection and/or Reselection

According to embodiments, high reliability D2D communications may be provided by using adaptive D2D resource selection, which may further include adaptive D2D resource reselection. According to certain embodiments, a UE may adaptively change, select, and/or reselect resources within a single scheduling period. D2D communication may assume a fixed and/or defined set of resources used over a scheduling period in a case where the UE makes the selection of those resources, as is the case in Mode 2, or in a case where those resources have been signaled by the eNB, as is the case in Mode 1. However, as multiple UEs may make the same or a related selection in a certain and/or same scheduling period, the current D2D communication method may result in interference. According to embodiments that include adaptive D2D resource selection and/or reselection, the D2D resources may be changed during the current scheduling period to ensure minimization of interference. According to embodiments, a transmitting UE may dynamically change resources used during the scheduling period, and the transmitting UE may switch from performing a transmission over a first selected set of resources to performing the transmission over a second selected set of resources.

Figure 7:
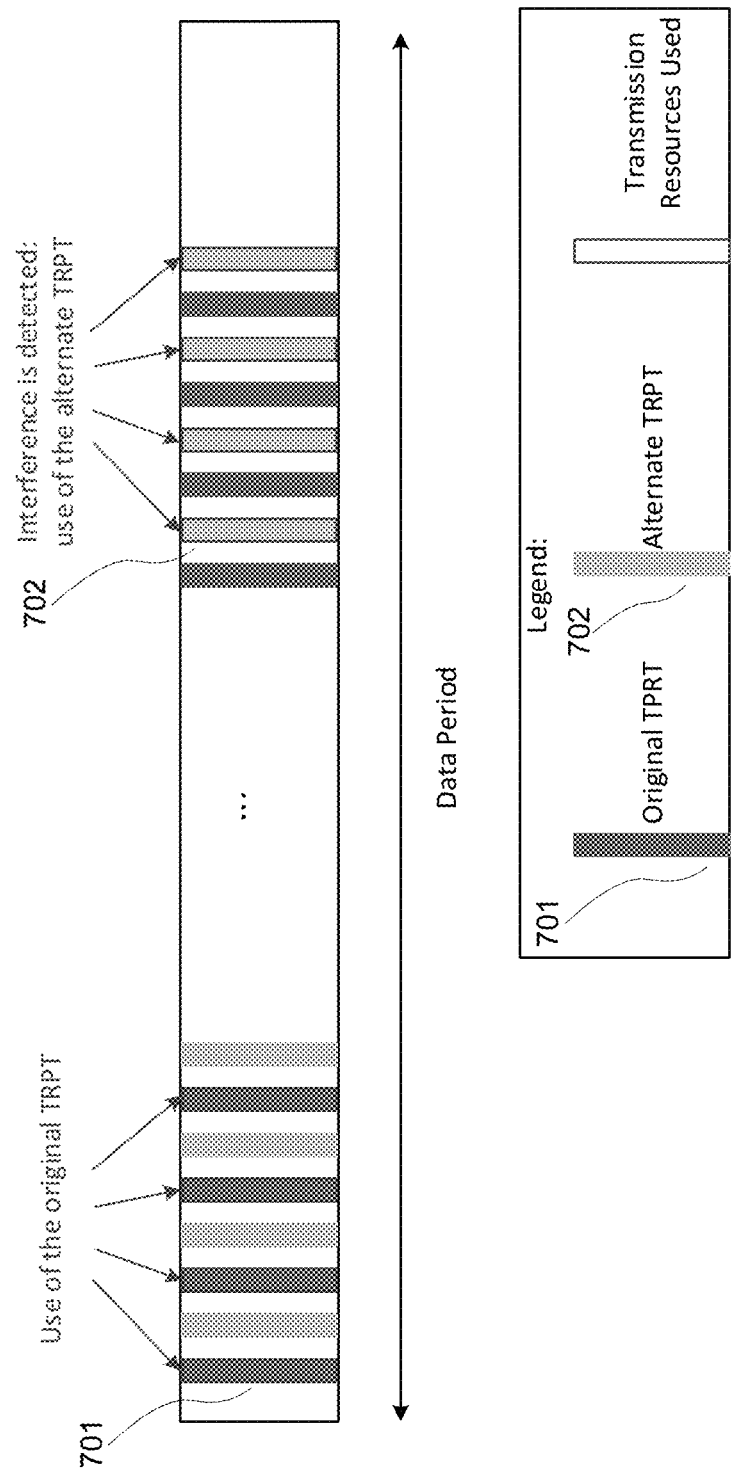
FIG. 7 is a diagram illustrating dynamically changing resources during a scheduling period according to an embodiment.

FIG. 7 is a diagram illustrating dynamically changing resources during a scheduling period according to an embodiment.

Referring to FIG. 7, according to embodiments, TRPT resources may be dynamically changed when interference is detected within a scheduling period. For example, the transmitting UE may sense a channel at the resources belonging and/or corresponding to a specific TRPT resource, such as original TRPT resources 701, that the UE is using for transmission. The UE may change TRPT resources being used from the original TRPT resources 701 to alternate TRPT resources 702 in a case where a level of interference or usage of the corresponding TRPT resources exceeds some amount, i.e., a predetermined threshold and/or a certain value.

According to embodiments, sensing and/or measurements may be performed, for example, by using a receiver chain (e.g., an additional receiver chain) and/or sensing hardware while the UE performs a transmission. According to certain embodiments, the UE may leave blank and/or unused resources within the resource set associated with the TRPT resources in order to perform sensing during these resources, i.e., during a time period during which the blank or unused resources would have been transmitted. The receiving UE may attempt decoding on both the original and alternate TRPT resources. The transmitting UE may signal both the original and alternate TRPT resources to the receiving UE in the SA. According to certain embodiments, the alternate TRPT resources may be identified by a known relationship with the original TRPT resources. This relationship may be defined in the standards, e.g. through a table, and/or derived from signaling from the transmitting UE and/or eNB.

According to embodiments, the sensing and/or measurements may be performed by an eNB and/or a road side unit if a UE is in coverage of the eNB and/or the road side unit. The eNB and/or road side unit may send an indication to the transmitting UE to change its TRPT resources, and/or to suggest and/or provide new TRPT resources. For example, the eNB may signal the change in TRPT resources during downlink Uu signaling, e.g. on a Physical Downlink Control Channel (PDCCH), that occurs during the scheduling period.

According to embodiments, one or more of the measurements may relate to one or more of a variety of characteristics, for example, signal characteristics such as a received signal quality, and/or any other similar and/or suitable quality measurement, such as Signal to Interference plus Noise Ratio (SINR). According to certain embodiments, measurements may be based on any one or more of a number of decoded SAs of a Physical Sidelink Control Channel (PSCCH), a data payload, e.g., a data payload of a Physical Sidelink Shared Channel PSSCH and/or a Physical Discovery Shared Channel (PDSCH). However, the disclosure is not limited thereto, and measurements may relate to any similar and/or suitable message and/or information upon which measurements and/or sensing performed by an eNB may be based.

According to embodiments, changes to TRPT resources, and/or any resources used by the UE, may occur during a certain scheduling period which may be pre-defined, determined by, and/or signaled to the UE. For example, a transmitting UE may change resource usage at a defined time period during transmission. This defined time period may be known in advance by both the transmitting UE and the receiving UE, and/or may be based on the data transmission itself. According to embodiments, the transmitting UE may change the TRPT resources for transmission after each HARQ transmission. In such a case, the original TRPT and/or an alternate TRPT resource may be identified by a known relationship with the original TRPT. This known relationship may be defined in the standards, e.g. through a table, and/or derived from signaling from the transmitting UE and/or eNB.

According to embodiments, a UE may perform simultaneous transmission over two sets of resources, such as TRPT resources. For example, a transmitting UE may transmit (e.g., simultaneously transmit) high reliability data over two sets of resources. A receiving UE may decode both of the two sets of resources. For example, the transmitting UE may transmit the same data over two different selected TRPT resources, both of which may be decoded by the receiving UE. As in the embodiments described above, one or more alternate TRPT resources may be identified by (e.g. based on, according to, etc.) a known relationship with the original TRPT resource. This relationship may be defined in the standards, e.g. through a table, and/or derived from signaling from the transmitting UE and/or eNB.

According to embodiments, a UE may spread a short message across an entire scheduling period. For example, a transmitting UE may transmit (e.g., may need to transmit) a high reliability message using fewer resources than allocated. In such a case, the UE may spread the high reliability message to be transmitted over a scheduling period, e.g., over an entirety or part of a scheduling period, by skipping certain resources within the scheduling period.

According to embodiments, skipping of certain resources may include a case where the UE determines not to transmit one or more HARQ transmission/retransmission. For example, in a case where a UE is configured with a D2D resource that includes four HARQ transmission opportunities per packet, the UE may be only able to use one of those HARQ transmission opportunities. In such a case, the one HARQ transmission opportunity to be used may be selected randomly among the four available HARQ transmission opportunities, and a receiving UE may blindly decode the received data.

According to embodiments, a predefined pattern may be used to select any one or more of the four transmission opportunities, and in such a case, the receiving UE may blindly decode the received data or may decode the received data according to the predefined pattern. According to certain embodiments, in a case where the UE determines to not transmit one or more HARQ transmissions/retransmissions, the UE does not transmit data in the non-selected HARQ transmission opportunities. Furthermore, the present disclosure is not limited to four HARQ transmission opportunities, and more or less than four transmission opportunities may exist per packet.

According to embodiments, a UE may transmit a short message using a TRPT resource having more resources than necessary (e.g., more resources than needed and/or used) for proper transmission of the short message. In such a case, rather than transmitting using each time-frequency resource included in the TRPT resource, the transmitting UE may skip certain ones of the time-frequency resources in order to spread the transmission over the entire scheduling period. In a case where the spreading of short messages is used by multiple UEs which may be transmitting high reliability short messages, concentration of the interference on the first part of the time-frequency resources, which would occur in the case of Rel12 rules, may be avoided. The time-frequency resources to be skipped within a specific TRPT resource may be selected by the UE randomly and/or according to any suitable method for selecting time-frequency resources. The time-frequency resources may also be defined according to a standard (e.g., by formula, derived from some UE specific value, such as a UE ID, or the like), so that different UEs may select different resources to skip. For example, a UE may be assigned a TRPT resource by the eNB or may select a TRPT resource. The UE may compute a number of resources needed to transmit the short message. The resources used to transmit the short message may be spread evenly over the scheduling period in order to determine the skipped time-frequency resources of the TRPT resource. According to certain embodiments, the UE may calculate a number of extra, i.e., unneeded, resources based on the amount of data to transmit and the TRPT resource. The UE may randomly select time/frequency resources based on this number of skipped time-frequency resources over the assigned and/or selected TRPT resource.

According to embodiments, a receiving UE may blindly detect and/or decode data received via the TRPT resource in order to determine the skipped resource elements. According to certain embodiments, the transmitting UE may transmit an indication to the receiving UE to indicate which resources are skipped. The indication may be transmitted in the SA and/or may be part of the data itself. For example, the transmitting UE may transmit a known signal or sequence, such as a preamble, as a signal during or prior to the skipped time/frequency resource. In such a case, the preamble may identify time-frequency resources that are skipped in the received TRPT resource. According to certain embodiments, the UE may transmit an indication consisting of an offset and/or a parameter indicating a number of transmission opportunities to skip. According to another embodiment, transmitting UE may use skipped resources in order to send information related to the channel for potential collisions, information related to overall business of the resources associated with the TRPT in question, or in order to send any other similar and/or suitable information.

According to embodiments, dynamic change of resources, for example, such as those discussed above, may be implemented over multiple scheduling periods. According to certain embodiments, the same high reliability message may be sent by the AS over multiple scheduling periods. In such a case, the message may be repeated in identical fashion or may be repeated with more coding/power, etc., in a second transmission (e.g., a retransmission) attempt. The retransmission of the message may use and/or be based on a different set of resources in the second scheduling period as compared to the set of resources used in the first scheduling period.

Adaptive Number of Retransmissions

According to embodiments, a UE may be configured to measure an amount of interference in a channel, e.g. a UE may perform a measurement based on one or more of the methods discussed above. According to certain embodiments, a UE may be configured to change a number of retransmissions of a certain packet (e.g., a discovery packet), an application layer payload, etc., based on the measurement. For example, the UE may be configured with a set of thresholds associated with and/or corresponding to a fixed number of retransmissions, and/or a total number of transmissions including a first transmission and all retransmissions. In such a case, a UE may be configured to use the number of retransmissions, and/or the total number of transmissions, based on a value of the measurement and one or more of the thresholds. Table 1 illustrates example thresholds, conditions, and corresponding retransmissions.

| Condition | Number of Retransmissions |
| --- | --- |
| $X_{1l} < x < X_{1h}$ | 1 |
| $X_{2l} < x < X_{2h}$ | 2 |
| $X_{3l} < x < X_{3h}$ | 3 | wherein, x is the measurement value, $X_{1l}$, $X_{1h}$, $X_{2l}$, $X_{2h}$, $X_{3l}$, and $X_{3h}$ are threshold values that may be configured by the network or preconfigured, e.g. as part of the protocol specifications, and wherein $X_{1h}$ may be equal to $X_{2l}$ and $X_{2h}$ may be equal to $X_{3l}$.

According to embodiments, changing a number of retransmissions allows for better reliability in a case where the number of transmitting users increases and the interference level becomes severe. According to certain embodiments, reducing the number of retransmissions may reduce overall interference in a system, for example, from a coverage standpoint.

Adjusting Other Transmission Parameters

According to embodiments, in addition to the aforementioned parameters, such as the number of retransmissions, a UE, based on measurements such as those discussed above, may also adjust any one or more of the following parameters: a transmit power, a transmission backoff, a modulation and coding scheme (MCS), and/or any other similar and/or suitable parameters.

Reducing the Impact of In-Band Emission (IBE)]

In-band emission (IBE) may cause interference in D2D scenarios and/or D2D communications. For example, in a case of V2X communications where the number of devices transmitting simultaneously may be relatively large. IBE may be caused by non-idealities in a transmitter of a device, and may result in leaked energy in non-allocated RBs. As many non-power controlled devices may transmit a signal during the same interval, IBE contributions from each of the non-power controlled devices may add up to a significant amount of IBE, or in other words, a significant value and/or amount of total IBE.

According to embodiments, interfering UEs may perform respective transmissions at different times and/or different intervals to mitigate IBE. According to certain embodiments, UEs may be provided with a list of pre-configured time-patterns for transmission. For example, the UEs may be allocated and/or may select a TRPT resource. According to certain embodiments, a UE may be configured to select a time-pattern which minimizes or reduces the transmission timing overlap in conjunction with other UEs. According to certain embodiments, a time pattern that reduces a transmission timing overlap may be determined, for example, based on information received on a PSCCH, e.g., a SA, from multiple UEs and by keeping the same transmission pattern for multiple scheduling periods.

According to embodiments, to reduce IBE, a UE may be configured to transmit at an edge of an allocated bandwidth. According to certain embodiments, a UE may be configured to hop from one edge of an allocated bandwidth to another edge at certain time instances, e.g., after a certain time interval. Changing, e.g., hopping to/from, an edge of an allocated bandwidth may help reduce IBE perceived by multiple UEs.

According to embodiments, to reduce IBE and/or reduce an impact of IBE, resources in the time domain may be reserved for reception only for a group of UEs within a vicinity. According to certain embodiments, in a case where a plurality of UEs in a same vicinity have one or more resources in the time domain reserved for reception, the one or more resources may not be subjected to any IBE from the UEs included in the plurality of UEs in the same vicinity. In such a case, a near-far problem, and/or other similar problems relating to signal interference, signal strength, and/or signal reception, may be reduced and/or avoided.

According to embodiments, resources, such as time domain resources, frequency domain resources, and time-frequency domain resources, may be reserved by defining non-overlapping groups of sub-frames within one or more pools of resources. According to certain embodiments, in a case having two groups of sub-frames, sub-frames A and sub-frames B, a group of UEs in the same vicinity may request to perform transmissions only on sub-frames A, or in other words, may be restricted to perform transmissions only on sub-frames A. In such a case, the group of UEs may not use the sub-frames B to perform transmissions. According to certain embodiments, in such a case, IBE may be reduced by defining non-overlapping groups of resources, such as sub-frames A and B, and reserving one or more of the non-overlapping groups of resources for transmitting and/or receiving operations.

According to embodiments, a UE may determine one or more groups of reserved resources by decoding control information, such as scheduling assignments and/or any other similar control information received by the UE from one or more other UEs. The control information may indicate a resource and/or a group of resources, such as the sub-frames A, used by the one or more other UEs. According to certain embodiments, the UE may determine one or more groups of reserved resources by measuring a received signal level and/or received signal quality level for one or more of received signals including and/or associated with the control information. According to certain embodiments, in such a case, the UE may determine to use or not use the one or more groups of reserved resources determined based on the measured received signal level and/or received signal quality level.

According to embodiments, a UE may receive control signal from other UEs and/or network elements. According to certain embodiments, a UE may generate a set of resource allocation information based on the received control signals. The set of resource allocation information may include control information included in the received control signals and information about the received control signals. For example, for each instance of the UE receiving a control signal, the UE may generate an element of the set of resource allocation information. According to certain embodiments, in such a case, each element may include the received control information and a signal strength of the received control signal that included the received control information (and/or any other similar type of information about the received control signal). According to certain embodiments, a UE may also generate an element and/or information included in an element based on a transmission associated with a received control signal. The UE may make determinations regarding a group of resources to be used for transmission and/or reception based on the elements included in the set of resource allocation information.

According to embodiments, elements of a set of resource allocation information may include any of: the identity of a group of sub-frames (such as a group of sub-frames used for transmission by other UEs); a received signal strength or quality level; an identity of the transmitter or of a group identity; an indication of whether the transmitter is associated with a vehicle or road side unit (or other infrastructure element); an indication that a control transmission is used as a reference for the determination of a group of resources by other UE's; a time when the control transmission was received; and/or an indication of transmission power (such as a transmission power used for a resource). According to certain embodiments, in a case where an indication of the transmission power is included in a received control signal, the UE may derive a path loss estimate from the measured received signal strength and the indicated transmitted power, and may include such information in the element corresponding to the received control signal. According to certain embodiments, a UE may determine to use or not use the one or more groups of reserved resources based on one or more elements of the set of resource allocation information.

According to embodiments, in a case where a UE has respectively received three different control signals from three other UEs, the UE may generate a set of resource information including three elements. In such a case, a first and second UE of the other UEs may indicate that they perform transmissions on a group of sub-frames A, and a third UE of the other UEs may indicate that it performs transmission on a group of sub-frames B. According to certain embodiments, in such a case, a UE may measure respective received signal strength indicators (RSSIs) of the control signals and may include that information in the respective elements. The elements may respectively indicate the group of sub-frames used for transmission, and a RSSI associated with transmissions on that group of sub-frames, with respect to each of the received control signals. According to certain embodiments, a UE may determine that the first and second other UEs are performing transmissions on sub-frames A with high RSSIs, while the third UE is performing transmissions on sub-frames B with a low RSSI. In such a case, the UE may select sub-frames A to perform transmissions on so as to not cause IBE that interfere with transmissions on sub-frames A from the first and second UEs.

According to embodiments, a UE may filter elements from the set of the resource allocation information. According to certain embodiments, a UE may include or exclude the filtered elements from being used to determine a group of resources to be used for transmission and/or reception. For example, a UE may exclude elements for which the received signal strength or received signal quality level is below a first threshold (or for which the path loss is above a threshold), or for which the time of reception was before the current time minus a second threshold. According to certain embodiments, in the case described above, where the UE has three different elements respectively corresponding to the three different control signals from the three other UEs, the UE may filter elements having a low RSSI. In such a case, the element corresponding to the control signal received from the third UE, which was received with a low RSSI, may be filtered from the set of the resource allocation information. According to certain embodiments, in such a case, the element corresponding to the control signal of the third UE, and the group of resources, sub-frames B, may be excluded by the UE and may not be used to determine which group of resources the UE will use to perform transmissions. According to certain embodiments, a UE may filter (e.g., only filter) up to a maximum number of elements of the list, where the filtered elements may be the ones with the highest received signal strength or quality level (or lowest path loss). According to certain embodiments, a maximum number of elements may be pre-defined, pre-configured or configured by higher layers.

According to embodiments, a UE may then determine that the group of resources (for example, such as a group of sub-frames) that it should use for its transmissions is the group that is included in the largest number of elements of the filtered set. For example, in a case where there are ten different elements corresponding to ten different UEs included in a set filtered based on RSSI, five of the elements may include an indication that five respective UEs use sub-group A for transmission, three of the elements may include an indication that three respective UEs use sub-group B for transmission, and two of the elements may include an indication that two respective UEs use sub-group C for transmission. According to certain embodiments, in such a case, the UE may select sub-group A for transmission because it is included the largest number of elements of the filtered set. In such a case, use of sub-group A may correspond to less IBE for surrounding UEs resulting from transmissions from the UE that selected to use sub-group A.

According to embodiments, in a case having a tie between two groups, the UE may select the group of resources corresponding to an element for which the received signal strength or quality is the highest (or path loss is the lowest). According to certain embodiments, in a case where there is no element in the filtered set, the UE may randomly select the group or may select a pre-defined or configured group. According to certain embodiments, the random selection and/or the pre-defined group selection may be used only in a case where no element of the filtered set has an indication that the control transmission is used as reference for the determination of a group of resources by other UE's, or that the transmitter consists of a road side unit or infrastructure element. According to certain embodiments, if elements included in a filtered set are for control signals that did not indicate that such control signal is used by other UEs as a reference for determining a group of resources (for example, did not include a reference indication indicating that the control signal is used by other UEs as a reference for determining a group of resources), then the UE making the determination of which group of resources to use may use the random selection and/or the pre-defined group selection.

According to embodiments, a control signal may include the reference indication indicating that the control signal is used by other UEs as a reference for determining a group of resources. According to certain embodiments, in such a case, the UE may determine that the group of sub-frames that it should use for its transmission is the group that is included in the element for which the received signal strength or quality is the highest (or path loss is the lowest) from among the elements of the filtered set that include the reference indication (or in other words, from among elements for which there is an indication that the control transmission is used as a reference by other UEs for determining a group of resources to be used, or for which there is an indication that the transmitter consists of a road side unit or infrastructure element.

According to embodiments, a UE may transmit a control signal (for example, a control signal received and used by other UEs to generate elements of the set of resource allocation information). According to certain embodiments, a control signal may include any of: an identity of the group of sub-frames used for the transmission, a transmission power level, an indication of whether the transmitter consists of a vehicle or road side unit or other infrastructure element, and the reference indicator indicating whether the control transmission is used by other UEs as a reference for determining a group of resources to be used. According to certain embodiments, a UE that transmits a control signal may determine that its control signal is used by other UEs as a reference or determining a group of resources to be used by the other UEs (for example, the transmitting UE determines to include a reference indicator in its transmitted control signal). Such a determination may be made in a case where the transmitting UE has generated a filtered set in which no element of the filtered set has a reference indicator, or has no element corresponding to a received control signal that indicates that its transmitter is a road side unit or infrastructure element. According to certain embodiments, a UE may determine that its control signal is used as a reference for determining a group of resources to be used in case there is no element in the filtered set.

According to embodiments, a set of possible groups of resources, such as time domain resources, frequency domain resources, and/or time-frequency domain resources, may be pre-defined, pre-configured and/or configured by higher layers, e.g. received from system information and/or dedicated signaling. According to certain embodiments, a set of groups may be defined for each configured resource pool for V2X communication.

Semi-Persistent Resources

According to embodiments, time domain, frequency domain, and/or time-frequency domain resources may be semi-persistently allocated to a UE. According to certain embodiments, a time-frequency domain resource may be allocated as a semi-persistent resource in order to be allocated for a relatively long duration as compared to a persistent resource and/or a non-semi-persistent resource. According to certain embodiments, in a case including V2X operations and D2D LTE systems and apparatuses, semi-persistent scheduling may be performed and/or executed, for example, by configuring a UE to keep and/or use one or more of resources, e.g., a TRPT, a physical resource block (PRB), etc., for a configured number of scheduling periods, which may be referred to as a resource selection periodicity "M". The use of semi-persistent resources may be advantageous in a static environment as UEs implementing a listen-before-talk (LBT) operation may determine resources that may be used to reduce interference.

In a case where a UE is configured with semi-persistent scheduling, keeping and/or using a resource for a long time may increase a probability of persistent collisions. Additionally, executing a LBT operation in a rapidly changing environment may result in a UE making selections and/or determinations regarding resource allocation that may not be efficient due to changes in the rapidly changing environment. Further, in such a case, performing a periodic re-evaluation for selections and/or determinations regarding resource allocation, for example, by the UE, may not be sufficient to address the problems of a rapidly changing environment, and thus, other approaches may be needed to address such a problem.

According to embodiments, in a case of aperiodic resource selection, a UE may be configured to re-evaluate a new set of persistent resource based on one or more triggers, in any order or combination. According to certain embodiments, the triggers may be any of: (1) a UE's environment changes, for example, the UE moves from a highway to an urban area; (2) a UE receives an explicit notification to reselect a resource, for example, the UE receives a reselect resource command from a controlling node; and (3) a UE's speed changes, and/or other external measurements/variables change.

According to embodiments, in a case where a UE's environment changes, the UE may be configured to detect a change in its environment. According to certain embodiments, a UE may detect the change in its environment based on a variety of measurements, including Doppler measurements. In a case where a UE performs Doppler measurements, the UE may be configured to perform Doppler measurements based on one or more reference signals received from an eNB or any other similar and/or suitable D2D LTE device and/or a V2X device. According to certain embodiments, a UE may determine when a significant change in the Doppler measurement occurs. For example, the UE may keep and/or store an estimate of past Doppler measurements and may determine that a significant change in a Doppler measurement occurs when one or more new measurements are above a threshold relative to the past Doppler measurements.

According to embodiments, in a case where a UE receives an explicit notification to reselect a resource, e.g., a reselection indication from a controlling node, the UE may receive indications from controlling nodes such as a road side unit (RSU) and/or other V2X devices. In such a case, according to certain embodiments, the UE may determine when it is within a certain range of a certain type of RSU and may perform a re-evaluation of its resources based on the determination regarding the range. For example, a certain type of RSU may be identified and/or characterized according to a location at which the RSU is deployed. In such a case, RSUs deployed at heavy traffic locations, such as a busy road intersection, may be configured to be identified and/or characterized by a signal, e.g., an explicit notification, that indicates a potential of there being a high density of traffic in a vicinity of the certain type of RSU to UEs.

According to embodiments, the UE may be configured to determine a change in the UE's speed, and/or changes to other external measurements and/or variables. In such a case, a UE may determine whether the UE's speed and/or the other external measurements and/or variables have changed in a manner similar to that as used to determine changes in Doppler measurements, as discussed above. According to certain embodiments, in such a case, measurements may be performed by subsystems included in the UE, such as a GPS and/or other sensors, and/or subsystems external to the UE. Furthermore, a UE may be configured to determine a change in an environment, such as a change of speed, based on measurements provided by subsystems internal and/or external to the UE.

According to embodiments, when one or more triggers, such as, for example any of the above discussed triggers, are detected by the UE, the UE may perform a variety of actions. According to certain embodiments, a UE may perform a resource selection by re-evaluating resources to be used by the UE. In such a case, a UE may be configured to perform a LBT operation and determine the best resource to use according to the configuration. As another example, a UE may change a resource selection periodicity M. In such a case, the UE may be configured with one or more values of the resource selection periodicity M, and the UE may determine to use a value of M corresponding to the trigger and measurement. According to certain embodiments, in high traffic scenario, a UE may be configured to select a short period for resource selection, such as M=1.

According to certain embodiments, when one or more triggers, such as, for example any of the above discussed triggers, are detected by a UE, the UE may change a resource selection algorithm. According to certain embodiments, in such a case, a UE may be configured to use different LBT parameters, to use random selection, or to use a different resource pool. According to certain embodiments, in a case where a UE changes a resource selection algorithm, a UE may be configured to use a certain resource selection algorithm and certain parameters corresponding to a respective one or more of the triggers and/or measurements. According to certain embodiments, when one or more triggers, such as, for example any of the above discussed triggers, are detected by a UE, the UE may change a scheduling period. For example, in a case where UEs report a high collision situation to the network, the network may reduce the scheduling period, and one or more of the UEs may dynamically change and/or modify a length of their scheduling period.

Receiving High Reliability Data

Figure 8:
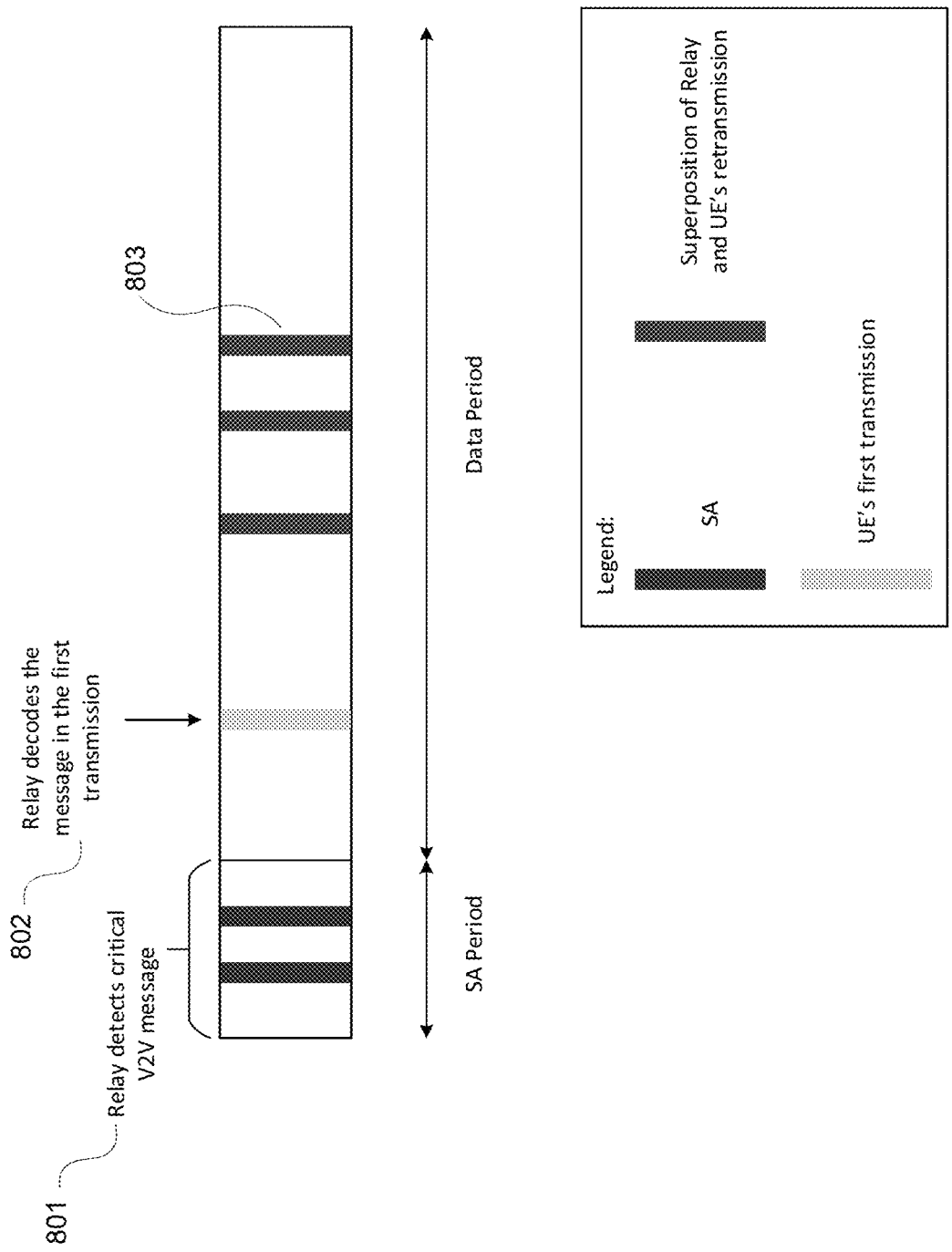
FIG. 8 is a diagram illustrating relaying of High Reliability Data according to an embodiment.

FIG. 8 is a diagram illustrating relaying of High Reliability Data according to an embodiment.

According to embodiments, high reliability D2D communications may be provided by relaying of high reliability data. According to embodiments, a V2X communication system may increase reliability of V2X and/or V2V links by enabling relaying. According to certain embodiments, V2X device enabling relaying, which may be referred to as a relay (e.g., any of an eNB, a relay switching unit (RSU), a UE, and/or any suitable element of a V2X communication system), may monitor SAs in the SA period in order to detect certain messages with a high reliability requirement. Referring to FIG. 8, in a case where the existence of a certain message is detected at operation 801, the relay decodes the packets within a corresponding V2V channel to decode the certain message at operation 802. Upon decoding the certain message, the relay may then resend the certain message, at operation 803, through one or more of the following methods.

According to embodiments, the relay may be an eNB providing evolved Multimedia Broadcast/Multicast Service (eMBMS). The relay may broadcast and/or multicast a V2V message in a case where the V2V message was originally destined to a group of UEs. According to certain embodiments, in order to reduce latency, the V2V message may stop at the MAC layer level. For example, the V2V message may not be processed by a layer and/or level above the MAC layer level. In such a case, the V2V message may be forwarded via a Multicast Channel (MCH).

According to embodiments where the relay is an eNB, the relay may perform a downlink unicast transmission in a case where a V2V message may be intended for only one UE. In such a case, in order to reduce latency, a V2V message may stop at the MAC layer level. For example, a V2V message may not be processed by a layer and/or level above the MAC layer level. In such a case, a V2V message may be forwarded via a Downlink Shared Channel (DL-SCH).

According to embodiments where the relay is either a UE or an eNB, the relay may use the same resources used by the UE transmitting V2V message. In order to reduce latency, the V2V message may stop at the MAC layer level. For example, the V2V message may not be processed by a layer and or level above the MAC layer level. In such a case, the V2V message may be forwarded via a Sidelink Shared Channel (SL-SCH). An embodiment of transmitting the V2V message via the SL-SCH is illustrated in FIG. 8.

According to embodiments where the relay is any of a UE or eNB, the relay may use different D2D resources than those used by a UE (e.g., different than those used by the UE to transmit an original V2V message that is to be relayed) to transmit (e.g., to relay) the original V2V message. According to certain embodiments, alternate D2D resources related to the original D2D resources may be used. Alternate D2D resources may be chosen based on and/or according to the methods discussed herein.

According to embodiments, a relay may detect that a message is a high reliability message using any of the following methods: (1) the V2V message may be indicated in the SA itself, using a specific field or indication bit, which may be referred to as an explicit indication bit; and (2) the SA may utilize resources (e.g., specific resources, such as time-frequency resources), which may be set aside and/or reserved for high reliability communications. According to certain embodiments, decoding of an SA sent using these resources may indicate that the V2V message in the corresponding data portion is a high reliability message.

According to embodiments, an explicit indication bit may be carried in an SA as a special destination identifier. For example, some set of identifiers may be reserved and/or configured for high-reliability messages. According to certain embodiments, a UE may be configured to detect and/or receive a high-reliability destination identifier and to determine whether to use a relay based on the received high-reliability destination identifier.

According to embodiments, control information associated with the high-reliability message may further carry a relay count indication, which may indicate a number of times the high reliability message has been relayed. According to certain embodiments, a relay count indication may be carried in the SA as an explicit indication, or may be implicitly indicated by the choice of destination ID. According to certain embodiments, a relay count indication may be explicitly included in a Media Access Control (MAC) control element (CE), and/or any other similar and/or suitable CE, field, and/or message.

According to embodiments, a UE may be configured with a maximum relay count, which may be a configured maximum value of a number of times the high reliability message has been relayed. According to certain embodiments, if the UE determines that a relay count indication is above a maximum relay count, e.g., the relay count indication exceeds a threshold, the UE may determine not to relay the high reliability message. According to certain embodiments, in a case where a relay count indication does not exceed the maximum relay count, the UE may be configured to increment the relay count indication and relay the high-reliability message with the newly incremented relay count indication.

According to embodiments, the high-reliability message may be configured with a maximum validity time. According to certain embodiments, UE may determine not to relay the high-reliability message if the message is determined to be expired based on the maximum validity time. A maximum validity time may be carried and/or included, for example, in a message payload, and/or in a control channel associated with the high-reliability message. For example, a maximum validity time may be explicitly indicated in an SA. According to certain embodiments, a maximum validity time may be relative to a System Frame Number (SFN). For example, the UE may be configured to compare a maximum validity time with an SFN or with a subset of SFN bits. As another example, a maximum validity time may be indicated in the high-reliability message payload itself and the UE, e.g., in the application layer, may determine whether or not the message has expired, for example, based on an absolute UTC time.

Multi-Carrier D2D Transmissions

According to embodiments, high reliability D2D communications may be provided by using multi-carrier D2D transmissions including a change of a carrier for a D2D transmission and a simultaneous transmission of V2X messages over multiple carriers.

According to embodiments, a UE that supports V2V communications and/or services may perform a V2V transmission on more than one carrier. A UE may dynamically change its transmitting carrier. According to certain embodiments, a trigger for and/or associated with changing the transmitting carrier may be based on any of a number of blindly decoded SAs and a number of received V2V messages in a given carrier frequency being above a value, such as a threshold and/or a preconfigured value.

According to embodiments, in a case where a number (e.g., a threshold and/or a preconfigured value) of blindly decoded SAs triggers a change of a transmitting carrier, the UE may calculate the number of transmitters in a given carrier based on the number of received SAs on the given carrier. According to certain embodiments, the number may not exclude the cases wherein identifiers included in SAs do not match to the UE ID. In a case where the number of interfering UEs is above a configured threshold, the UE may change the carrier frequency.

According to embodiments, in a case where the number of received V2V messages in a given carrier frequency being above a threshold triggers the change of a transmitting carrier, the UE, while receiving V2V messages, may conclude (e.g., may determine) that the channel condition is bad due to the measured interference. In such a case, the UE may change its transmitting carrier, e.g., change a carrier frequency, when the UE starts transmitting.

According to embodiments, a transmitting UE may inform receiving UE(s) of a change in transmitting carrier by transmitting a message indicating the change. The message indicating the change may contain the new carrier as well as alternate carriers. According to certain embodiments, a receiving UE may be aware of the alternate carriers and may simultaneously decode D2D messages on both carriers, e.g., on an original transmitting carrier and on the alternate carriers.

According to embodiments, a UE may perform a V2V transmission on more than one carrier by transmitting a V2X message over a single D2D scheduling period such that the V2X message is transmitted using multiple carrier frequencies. In such a case, D2D resources used by a UE may be spread over time, over one or more frequencies, as well as over a carrier or a channel.

According to embodiments, a carrier to be used may be part of the TRPT resources. D2D resources may be defined for each carrier within a data pool, and the TRPT resources may be selected with respect to specific time-frequency resources on each of the carriers within the data pool. For example, the TRPT resources may be transmitted at specific time-frequency resources on each of the carriers within the data pool. The SA resources may be defined over a single carrier or may be defined over two or more different carriers in the same way. The transmitting UE may transmit a single TRPT resource, which may indicate resources on two different carriers to be received by the receiving UE. According to certain embodiments, independent resource pools may be defined over different carrier frequencies.

Methods for Interference Control and Rate Control

According to embodiments, in order to reduce interference and/or in order to provide interference control (for example, using rate control), a number of UEs occupying and/or using a medium, such as a frequency band, may be reduced and/or lowered in a case where a large number of UEs are occupying and/or using the frequency band. According to certain embodiments, in a first phase of interference reduction, the UE may be configured to perform measurements and determine whether a high collision rate situation is occurring. According to certain embodiments, the measurements and/or determination may be implemented and/or executed at the access stratum and/or at the application layer. In a second phase of the interference reduction, a UE may be configured to reduce its transmission rate based on the determination made in the first phase. According to certain embodiments, a transmission rate reduction may be applied to a certain type of UE traffic, for example, periodic traffic. In such a case, the transmission rate reduction may be implemented by, for example, mapping periodic traffic on a separated logical channel with a specific priority level such that other traffic, e.g. event-driven traffic, may not be affected by the transmission rate reduction.

Access Stratum Based Measurements and Determinations

According to embodiments, in a case where measurements and/or determinations regarding rate control are performed by the access-stratum, a UE may determine and/or detect a high-collision rate. According to certain embodiments, in order to determine and/or detect the high collision rate, the UE may perform a variety of operations and/or measurements. For example, a UE may measure a number of SAs received within a scheduling period, and the UE may be configured to determine when the number of SAs received within the scheduling period is above/below a configured threshold. As another example, there may be a case where the UE is configured to estimate and/or determine a number of UEs and/or a number of transmissions using the same resources. According to certain embodiments, in such a case, after decoding SAs, the UE may determine that N UEs and/or transmissions are using the same resource, such as the same time-frequency resource, and the UE may be configured to determine if the value of N is above or below a configured threshold $N_{thr}$.

According to certain embodiments, a UE may be configured to measure an energy of PRBs associated with one or more resource pools. In such a case, a UE may measure the energy of an entire bandwidth allocated to a resource pool, the UE may also be configured to measure the allocated bandwidth of multiple resource pools, and the UE may be further configured to determine if the energy is above or below a threshold. According to certain embodiments, a UE may be configured to measure a number of detected SAs within resource pool. According to certain embodiments, a UE may measure a number of MAC PDUs successfully received within a SA period.

According to embodiments, measurements (for example, the above discussed measurements) may be made and/or determined for one or more resource pools and/or for one or more scheduling periods. In such a case, a UE may be configured to continuously and/or autonomously perform measurements and/or determinations. According to certain embodiments, a UE may be configured to perform one or more of these measurements based on one or more triggers. According to embodiments, a measurement, such as any of the above measurements, may be used as a trigger to initiate further measurements. In such a case, the UE may be configured to measure the number of SAs within a scheduling period and if the UE determines that the number of SAs is above a threshold, the UE may start measuring the energy of the PRBs associated with the resource pool. According to certain embodiments, there may be a case where the UE receives a dedicated signal from a controlling node indicating that the UE is to start measurements. In such a case, a controlling node may be an eNB, a RSU, and/or any type of controlling node deployed by the network.

According to embodiments, a UE may report measurements to a controlling node, e.g., an eNB, a RSU, etc. For example, there may be a case where a controlling node may conclude and/or determine that there is a high collision situation, or in other words may determine that a high amount of collisions are and/or may occur, based on one or more received reports from other UEs. In such a case, a controlling node may be in a better position, or in other words may be better suited, to determine whether the resource is overloaded or not, e.g., may determine that a UE measures a high energy on a given PRB due to the fact that another nearby UE is transmitting on the given PRB.

According to embodiments, a UE may process measurements and determine whether a high amount of collisions are occurring, or in other words, determine whether a high collision situation is occurring. For example, in a case where a UE makes such a determination, the UE may determine that a high collision situation is occurring on one resource and/or on multiple resources, e.g., more than one resource of a pool of resources. According to certain embodiments, in such a case, a UE may determine the high collision situation based on a variety of factors, including an amount of energy sensed on a resource, and/or a number of UEs using a resource.

According to embodiments, in a case where a UE determines the high collision situation based on the amount of energy sensed on a resource, the UE may compare an amount of the energy measured in one or more resources with a threshold. For example, according to certain embodiments, the UE may compare the amount of energy sensed in a set of k PRBs with $E_{Th}$, wherein k is the number of PRBs being measured, e.g. the number of PRBs in a resource pool, or the number of PRBs allocated to V2X traffic, and $E_{Th}$ is the energy threshold.

According to embodiments, in a case where a UE determines the high collision situation based on the number of UEs using a resource, the UE may be configured to determine the number of UEs using the same resource based on SA detection. In such a case, for example, the UE may compare the number of UEs corresponding to conflicting and/or colliding SAs with a threshold. According to certain embodiments, a UE may determine the number of colliding UEs based on a number of received MAC PDUs on a specific resource, e.g. a TRPT, a PRB, etc. For example, according to certain embodiments, a UE may decode all the MAC PDUs received on a given TRPT and calculate the number of different transmitting UEs which are using that TRPT. In such a case, a UE may compare the number of different transmitting UEs with a threshold. As another example, a UE may determine a number of V2X devices in a vicinity of the UE based on a discovery procedure.

According to embodiments, a UE may be configured to, upon detecting a high collision situation, autonomously reduce a transmission rate in order to avoid congestion and/or interference, and the transmission rate reduction may be applied to only certain types of traffic, e.g., periodic traffic. For example, there may be a case where the UE is configured to reduce a number of allowed retransmissions per packet, which may be achieved by not transmitting one or more of the retransmissions for a given HARQ process and/or data packet. According to certain embodiments, a UE may randomly select which retransmissions and/or transmission opportunities to not use for transmission, i.e. the UE may select transmission opportunities to puncture, or the UE may be configured with a specific order of retransmissions to puncture. For example, in a case where the UE is configured to puncture the $2^{nd}$, $3^{rd}$ and $4^{th}$ transmissions, in that order, if the UE determines to puncture 2 out of 4 transmissions, the UE may determine not to transmit the $2^{nd}$ and $3^{rd}$ transmissions. According to certain embodiments, a number of transmissions that are to be removed or punctured may be based on an amount of congestion measured.

According to embodiments, a UE may be configured to reduce a number of transmission occasions, i.e., may reduce a number of transmission opportunities used to perform a transmission. For example, according to certain embodiments, there may be a case where a UE reduces a number of sub-frames allowed for transmission from among sub-frames included in a resource pool. In such a case, the UE may select which of the sub-frames to temporarily remove as a random selection or based on a specific and/or pre-defined sequence. According to certain embodiments, the number of sub-frames that are removed may be based on a variety of factors, such as the amount of congestion measured.

According to embodiments, a UE may be configured to backoff, e.g., backoff from transmitting a signal, for a certain period of time when the UE detects high collision situation and/or detects a high amount of usage of a medium, such as a frequency band. According to certain embodiments, a UE may receive an explicit indication from a controlling node to backoff in a case where the controlling node detects and/or determines the high collision situation and/or the high amount of usage of the medium. According to certain embodiments, a UE performs a backoff and the UE may: (1) immediately stop transmitting signals; (2) continue transmitting a signal that is currently being transmitted and its associated retransmissions before stopping transmission; and (3) continue transmitting a signal that is currently being transmitted and its associated retransmissions before stopping transmission at a start of the next scheduling period.

For example, according to certain embodiments, in a case of immediately stopping the transmitting of signals, the UE may be configured to drop all the remaining retransmissions of a current packet, and the UE may then perform a backoff. Such an immediate stopping of transmitting may be applied in an emergency situation wherein certain UEs are no longer allowed to interfere with a higher priority UE. As another example, in a case of stopping transmission of new signals after transmitting a signal that is currently being transmitted and its associated transmissions, a UE may be configured to keep retransmitting the current message and to stop retransmissions after the UE finishes transmitting all configured retransmissions, and a UE may perform a backoff. As yet another example, in a case of stopping transmissions at the start of the next scheduling period, the UE may be configured to keep transmitting for remaining transmission opportunities within the current scheduling period, and to stop transmitting from the start of the next scheduling period during which the UE may perform a backoff.

According to certain embodiments, when a UE is performing a backoff, or in other words when a UE is applying a backoff, the UE remains silent during a period of time and then transmits messages after not transmitting messages for the period of time. The backoff duration may be selected randomly using configured parameters, e.g., a Poisson distribution used with parameter A signaled from the network, or determined via a rule that may be pre-configured.

According to embodiments, periodic traffic may be included in a certain queue of data, e.g., a buffer included in a memory of the UE. For example, in a case where a UE includes a certain queue, e.g., a special and/or separate queue, for periodic traffic, the UE may be configured to overwrite packets in the queue that were not previously transmitted with a new application layer packet. According to certain embodiments, in such a case, a UE may overwrite the packets that were not previously transmitted based on the fact that some of the periodic traffic packets may have a time expiration, and overwriting expired periodic traffic packets with newer ones may allow the UE to avoid overloading the system with expired information. As another example, according to certain embodiments, a UE may be configured to overwrite only the packets which have a time expiration and to keep the other packets that are not expired in the buffer. As yet another example, the UE may be configured to delete expired packets from the buffer, and the deletion of the expired packets may be carried out continuously.

According to embodiments, a UE may use a special queue for periodic traffic in combination with autonomous rate control. In such a case, a UE may reduce transmissions over an air interface without creating a large backlog of data to transmit, and while making sure that the data to transmit is still relevant, (e.g., not expired). For example, in a case where the UE is configured to determine when a high collision situation occurs, the UE may, upon detection of the high collision situation, stop transmitting the periodic traffic and place the corresponding packet of periodic traffic in the special queue, and the UE may then transmit data from that special queue.

Application Layer Based Measurements and Determinations

According to embodiments, a UE may be configured to periodically determine a number of V2X messages detected during a period of time. For example, in a case where a number of messages exceeds a threshold, which may be a pre-configured threshold, a UE may determine that a high collision rate situation is occurring. In such a case, an application layer of the UE may reduce a transmission rate of periodic traffic in order to reduce a traffic load from a system level perspective. According to certain embodiments, a UE may keep using the reduced rate for a period of time, such as a pre-configured time period, before using the transmission rate that was not reduced.

Methods for Communicating between Different Networks

As noted above, V2V communications performed using LTE D2D systems may suffer a shortcoming in that LTE systems may not allow for communications between UEs which belong to different networks. In a case where a UE is out of coverage, the UE may be pre-programmed with a specific carrier and/or frequency corresponding to carriers employed by a specific PLMN and/or service provider. However, there are currently no provisions allowing UEs belonging to different PLMNs to communicate with each other using LTE D2D systems. Such lack of communication between UEs of different PLMNs is a problem in the case of V2V and/or V2X communication, wherein different vehicles and network apparatuses need to communicate with each other, regardless of the provider or network. According to embodiments, V2V communications between different networks may be performed by using a dedicated V2V frequency between different networks and/or by using service based frequencies between different networks.

According to embodiments, a dedicated frequency band for all V2V services may be reserved so that the dedicated frequency may be used by any V2V device, (such as, for example, V2V UEs, D2D terminals, etc.) belonging to different service providers. Consideration of D2D communication in Release 12 for out-of-coverage situations are limited to communications on the same PLMN. However, according to embodiments, a dedicated frequency may solve the above noted problem of providing D2D communications in out-of-coverage situations.

According to embodiments, in order to provide a dedicated frequency, a UE may be pre-configured with resource information related to the dedicated frequency. For example, the resource information may include information on a carrier frequency, system bandwidth, reference signals, IDs, and/or any other similar and/or suitable information related to the dedicated frequency. According to certain embodiments, in a case where the UE moves to an out-of-coverage area, the UE may start using the resources based on the resource information related to the dedicated frequency. In such a case, extra signaling may not be needed. According to certain embodiments, in a case where the UE is in-coverage, the eNB may instruct the UE to use pre-configured resources, and/or use resources different than the pre-configured resources. According to certain embodiments, the eNB may indicate to the UE the resource pool to be used for transmission and/or reception of signals to and/or from other PLMNs.

According to embodiments, different carriers (e.g., different carrier frequencies) may be reserved and/or allocated for different V2V services. Depending on a V2V service, the UE may use its Home-PLMN V2V resources or may switch to another carrier, such as a dedicated frequency band or carrier. According to certain embodiments, in order to inform other UEs about the different carriers corresponding to different V2V services, a UE may advertise the different carriers as V2V carriers, and/or the eNB may signal which frequencies are used by different PLMNs.

According to embodiments, in a case of the UE advertising the V2V carriers, the UE may be configured to inform other UEs, which may belong to one or more different PLMNs, about the V2V resources of its Home PLMN through discovery or communication signals. A UE that supports V2V service may periodically monitor the advertised resources to receive the V2V messages. These advertised resources (e.g., the V2V resources) may be on dedicated V2V frequencies. According to certain embodiments, in the case of the eNB signaling frequencies used by different PLMNs, the eNB may signal information, such as a list of frequencies and/or resources used by other service providers, to support V2V services. A UE that supports V2V service may periodically monitor the signaled information. According to certain embodiments, the eNB may signal this information using SIBs, may use dedicated RRC signaling to the UE, and/or may use any other similar and/or suitable method to advertise and/or signal the information regarding V2V resources.

Providing Sidelink Operations in a Fast Vehicle Environment

According to embodiments, in order to support communications between fast moving vehicles, a number of changes may be needed to Release 12 D2D operations. For example: (1) in order to support high Doppler, additional pilots may be used; (2) in order to support reduced latency, shorter scheduling periods and sending control information with data payload may be used; and (3) in order to support variable payload sizes, synchronization, for example, based on Global Navigation Satellite System (GNSS), may be used. According to certain embodiments, some solutions associated with a number of changes corresponding to sidelink operations, which may refer to D2D communications, such as V2V communications and/or V2X communications, are discussed below.

Pool Management

In a case where a UE is moving from one cell to another cell at a high speed, latency issues and/or problems may arise. According to related art, such as Rel. 12/13 3GPP D2D standards and publications, UEs need to read SIBs of a new cell in order to acquire resource pool information. In such a case, an extra delay may be introduced and, consequently, the latency may increase. In some critical scenarios, the extra delay and/or increased latency may not be tolerated, e.g., in a critical scenario wherein a vehicle is transmitting high-priority traffic while moving at high speed and changing its serving cell.

According to embodiments, there may be a case having a UE configured with a static pool of resources in order for the UE to avoid reading SIBs. In such a case, according to certain embodiments, a UE may be configured to autonomously switch to the static pool if a Uu link of a serving cell is below a threshold, e.g., a pre-configured threshold. For example, the static pool may be configured on a dedicated V2X carrier and the UE may acquire a new resource pool of the new cell while using the static pool, such that once the UE selects the new resource, the UE may switch to the new resource pool. As another example, the static pool may be configured on one or more serving PLMN carriers, and the UE may be configured to keep using the static pool even if the new resource pool of the new cell is known by the UE.

According to embodiments, an eNB may configure one or more special pools of resources using in-band SAs and extremely short scheduling periods, e.g. 2 ms, to be used by the UE in critical scenarios. According to certain embodiments, the special pools of resources may compensate for the delay generated by reading the SIBs. In such a case, other pools may use regular SA schemes and may be used by the UE if there is no delay sensitive traffic.

Global Frame Synchronization/Coarse Synchronization

According to embodiments, synchronization based on a GNSS, such as a Global Positioning Satellite (GPS) system and/or a Galileo navigation satellite system, may be advantageous for V2X communications, particularly in a case where a transmission is taking place in a dedicated spectrum, i.e., a band, with no cellular coverage in that band.

According to certain embodiments, using a GNSS as a time reference may allow for an absolute time reference to be provided to and/or used by the UE. In such a case, using the GNSS, synchronized UEs may share the same global time reference. According to certain embodiments, the time used for the reference may be the Coordinated Universal Time (UTC). According to certain embodiments, with respect to physical layer procedures, all of the bits of the UTC time may not be needed, but rather a subset of the bits, e.g. only the 10 least significant bits (LSBs), may be needed and/or used. In such a case, a System Frame Number (SFN) may be derived directly from the UTC. According to certain embodiments, a UE may be configured to acquire a global time reference, e.g., UTC, and then determine the SFN from the UTC.

While GNSS signals may be available anywhere on the planet, accurate reception of those signals may be challenging in certain environments, such as underground tunnels and/or parking garages, during storms, and/or any other similar environments causing GNSS signal degradation. In such a case, for reliable V2X communications, synchronization that also supports a fallback mechanism to ensure reliable communication is desirable.

According to certain embodiments, a UE may be configured to monitor a quality of a frame synchronization source. In such a case, the UE may determine and/or find another frame synchronization source when the UE loses the GNSS signal for a certain amount of time, e.g., a predetermined amount of time. According to certain embodiments, in such a case, the UE may be capable of maintaining frame synchronization for a relatively long period of time even without GNSS support.

According to embodiments, when a UE determines that it has lost a GNSS signal for a certain amount of time, the UE may be configured to find a new frame synchronization source. In such a case, according to certain embodiments, a UE may first attempt to find and/or select another source of synchronization, and a UE may prioritize the synchronization sources having direct access to a GNSS signal. Such synchronization sources may be another V2X device with access to a GNSS and/or a global time reference. According to certain embodiments, a UE may prioritize frame synchronization to be first from network infrastructure and then, second, to be from other UEs in the same way as Rel12.

According to embodiments, a UE may be configured to obtain UTC from sources other than a GNSS, e.g. the UE may be configured to obtain UTC from a System Information Block (SIB) 16 (SIB16), or via any other similar and/or suitable means. Obtaining UTC from sources other than a GNSS may be appropriate in a case where the UE has not yet acquired a GNSS, for example, at the time of device initialization. According to certain embodiments, since a UE may lose global synchronization for periods of time, a receiver of the UE may be configured with a larger receiving time window to receive signals from other UEs.

Tight Frequency Synchronization

Frame synchronization (e.g., coarse frame synchronization) may not be sufficient to demodulate signals from other UEs, and thus, accurate channel estimation and frequency offset may also need to be carried out. In such a case, according to certain embodiments, a UE may be configured to transmit a known preamble and/or postamble signal in order to better perform channel estimation and/or frequency/channel estimation, which may be referred to as tight frequency synchronization.

Scheduling/Discovery Periods and Transmission Time

According to embodiments, a UE may be operating for a long period of time under no network coverage and such a UE may be configured with absolute time-based resources for discovery and/or communications.

In such a case, according to certain embodiments, UEs may need to transmit the same data payload more than once to provide sufficient coverage. According to certain embodiments, to achieve a benefit from multiple retransmissions, a receiving UE should associate the multiple transmissions together. According to Rel12 discovery, this association may be carried out by having a one-to-one mapping between the physical resources used for the first transmission and all retransmissions. However, with this approach, a UE may wait for the next discovery frame in order to start transmission, which may result in a delay that is not acceptable for V2X communications.

Figure 9:
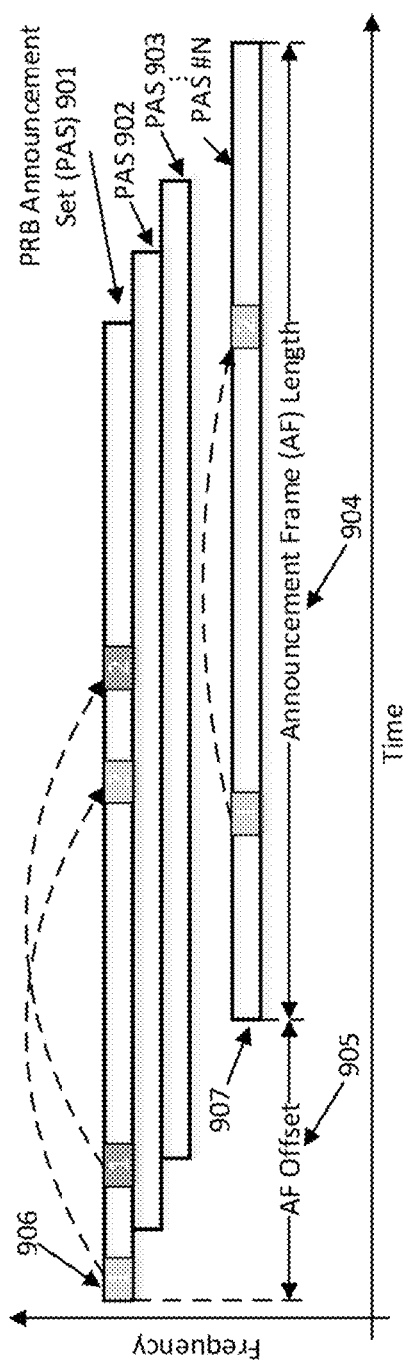
FIG. 9 is a diagram illustrating multiple retransmissions according to an embodiment.

FIG. 9 is a diagram illustrating multiple retransmissions according to an embodiment.

Referring to FIG. 9, according to embodiments, in order to reduce a delay associated with multiple transmissions, a UE may be configured with multiple sets of Physical RB (PRB) resources. According to certain embodiments, multiple sets of PRBs may be staggered in time. For example, a UE may be configured with N PRB Announcement Sets (PASs), which may include PASs 901, 902, and 903, wherein N may be an integer value. In such a case, each PAS may be characterized by a set of PRBs, an announcement frame (AF) length 904, which may be the same for all PASs, and an AF offset 905. The AF offset 905 may indicate a start of a specific PAS, and may be indicated with respect to a start of a radio frame, e.g., the AF offset 905 may be relative to SFN, for example.

According to embodiments, a UE transmission, which may be an "announcement", and the associated retransmission may all take place within the AF. In such a case, according to certain embodiments, retransmission resources may be associated with a first transmission via a one-to-one mapping, which may be a predetermined one-to-one mapping. As illustrated in FIG. 9, there is a one-to-one mapping between a first transmission 906 and a second transmission 907 of the announcements included in the PASs, which may be from different UEs.

Figure 10:
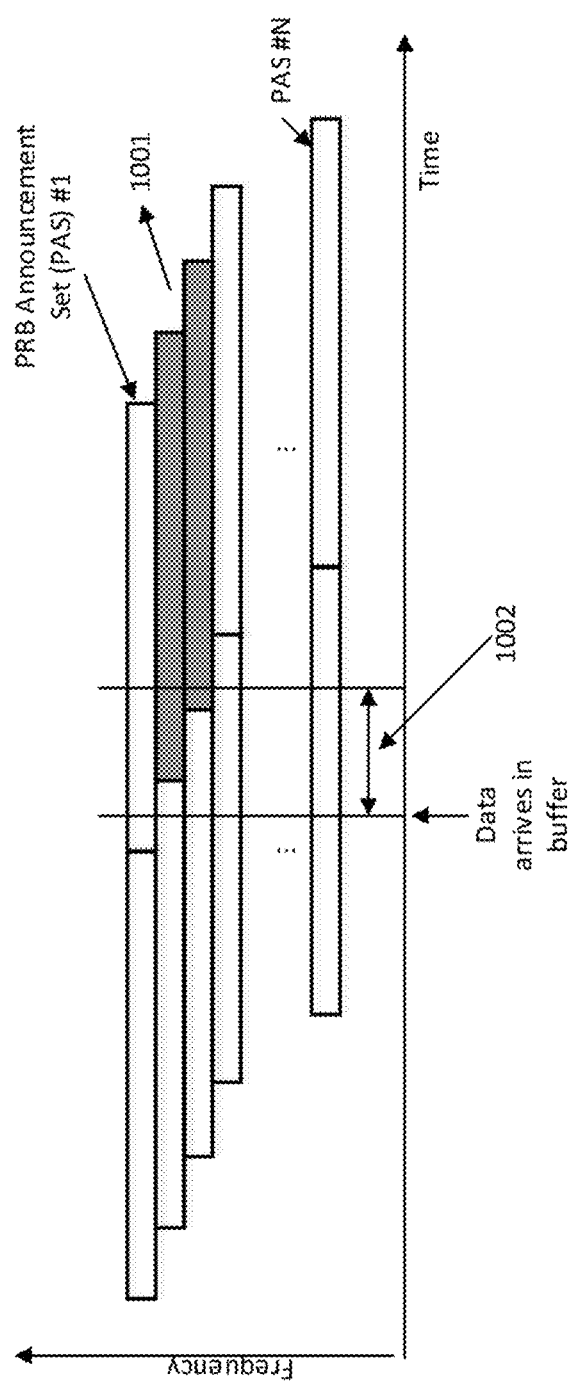
FIG. 10 is a diagram illustrating reduction of transmission latency according to an embodiment.

FIG. 10 is a diagram illustrating reduction of transmission latency according to an embodiment.

Referring to FIG. 10, according to embodiments, in order to reduce the transmission latency, a UE may be configured to select a PAS based on the UE's AF offset. According to certain embodiments, in a case where a UE has data in its buffer for transmission, a UE may be configured to determine a set of candidate PASs 1001 for transmission. The set of candidate PASs 1001 for transmission may be determined based on a set of time offsets, or, for example, based on an AF offset. According to certain embodiments, a UE may be configured to select one of the candidate PASs for which a beginning of an associated AF starts within a time window, e.g., within a candidate PAS time window 1002, from the time when the UE has data in its buffer for transmission.

According to embodiments, a candidate PAS time window 1002 may be measured based on and/or with respect to a fixed number of upcoming candidate PASs. According to certain embodiments, for example, a candidate PAS time window 1002 having a value of 2 indicates that the next 2 upcoming PASs are part of the set of candidate PASs. In such a case, the set of candidate PASs should always contain at least 1 PAS, which may be the next available PAS in time. According to certain embodiments, a candidate PAS time window having a value of 0 may indicate that the set of candidate PASs includes only the next available PAS.

According to embodiments, the set of candidate PASs 1001 may have a single element, e.g., may have one candidate PAS, and/or may consist of the PAS for which its AF is the closet in time. According to certain embodiments, a UE may be configured to select one PAS from the set of candidate PASs, which may be accomplished, for example, by using a random function. However, the present disclosure is not limited thereto, and the UE may select one PAS from the set of candidate PASs based on any suitable and/or similar method.

According to certain embodiments, in a case where a UE has selected one PAS from a set of candidate PASs, the UE may be further configured to select one or more resources from the set of candidate PASs for transmission, for example, using a random function.

In the embodiment illustrated in FIG. 10, candidate PASs are illustrated as if they are continuous in frequency. However, the present disclosure is not limited thereto, and it should be understood that other configurations (for example, a configured frequency, frequency band, etc.) of one or more PASs are also possible and the methods and procedures discussed above may be applied to the other configurations as well.

Candidate PAS Time Window and Message Priority

According to embodiments, a UE may be configured with one or more candidate PAS time windows, such as one or more of the candidate PAS time window 1002. According to certain embodiments, for example, a UE may be configured with a candidate PAS time window having a value of 0, wherein the UE selects the next available PAS. In such a case, the UE may be configured to determine which of the one or more candidate PAS time window values to use based on a priority of a message that is to be transmitted. For example, a high-priority message could be mapped to a short candidate PAS time window, e.g. a candidate PAS time window value of 0 and/or a candidate PAS time window indicating immediate transmission, while a low priority message may be mapped to a longer candidate PAS time window. In such a case, according to certain embodiments, potential collision of low-priority messages may be reduced, while not unnecessarily delaying important messages.

Figure 11:
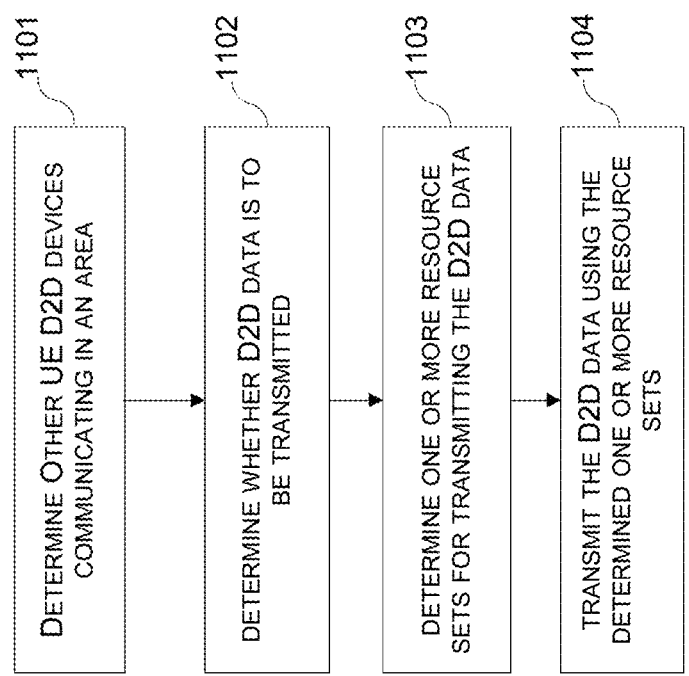
FIG. 11 is a diagram illustrating a flowchart for executing V2V communications according to an embodiment.

FIG. 11 illustrates a flowchart for executing V2V communications according to embodiments.

Referring to FIG. 11, a method of a UE device executing V2V communications using a D2D LTE network is illustrated. The method illustrated in FIG. 11 may be implemented according to and/or by a variety of embodiments including a vehicular communication system that includes any full or partial combination of communication systems and apparatus embodiments illustrated in FIGS. 1-5. For example, a user equipment, a network equipment, a vehicle, a roadside unit, or any other element of the vehicle communication system may be and/or may include any one or more of the WTRUs 102a, 102b, 102c, 102d, the elements included in the RAN 103/104/105 and/or any other suitable and/or similar element illustrated in FIGS. 1-5.

At operation 1101, a UE D2D device may determine UE D2D devices communicating in an area. According to embodiments, the UE D2D device may receive and/or have information indicating that another UE D2D device is any of communicating, attempting to communicate, and requesting to communicate. For example, the UE D2D device may receive such information in a message (e.g., a signal) transmitted by any of another UE D2D device and a device executing V2V communications (e.g., a roadside unit). As another example, the UE D2D device may receive such information in response to a message transmitted by the UE D2D device. For example, according to certain embodiments, the UE D2D device may transmit a resource set and/or information related to a resource set corresponding to the UE D2D device. In such a case, a UE D2D device may determine UE D2D devices communicating in an area based on a response to transmitting a message including a resource set and/or information related to a resource set. As another example, the UE D2D device may transmit a proximity signal. According to certain embodiments, the proximity signal may include any of a UE ID, a list of the UE D2D device identified by the UE, an ID of a vehicular cooperation group to which the UE is currently joined, a vehicle speed, and a direction of a vehicle corresponding to the UE. In such a case, a UE D2D device may determine UE D2D devices communicating in an area based on a response to transmitting a proximity signal.

At operation 1102, the UE D2D device may determine whether D2D data is to be transmitted. For example, the UE D2D device may determine that information generated by and/or relating to the UE D2D device is to be transmitted. As another example, the UE may determine that information generated by and/or relating to another UE and/or another device executing V2V communications is to be relayed based on a transmission of data by the UE D2D device.

At operation 1103, the UE D2D device may determine one or more resource sets for transmitting the D2D data. According to certain embodiments, the UE D2D device may transmit the one or more resource sets and/or may transmit information related to the one or more resource sets, and may include information indicating that the one or more resource sets correspond to the UE D2D device.

According to embodiments, a resource set may be transmitted on a D2D synchronization channel. According to certain embodiments, a resource set may be transmitted as a master information block (MIB) broadcast message, and may be transmitted using one of D2D discovery or D2D communication. The MIB broadcast message may be transmitted at a specific time, according to a period of time, and/or at any time. According to certain embodiments, a resource set may include any of a transmit resource pool, a scheduling assignment (SA) resource, a data transport (TRPT) resource, a UE Identifier, and a time period.

According to embodiments, a resource set may be determined according to a stored one or more resource sets that may include one or more of a resource set corresponding to the UE D2D device and one or more resource sets corresponding to other UE D2D devices communicating in the area. According to certain embodiments, a resource set may be determined based upon receiving one or more resource sets from any of another UE D2D devices, an eNB, and a roadside unit. According to certain embodiments, a resource set may be determined based upon receiving one or more of a Downlink Control Information (DCI) message, a Radio Resource Control (RRC) message, and a Media Access Control (MAC) Configuration Element (CE).

According to embodiments, determining a resource set may include any of determining that the UE device is a member of a cooperation group and determining a resource set corresponding to the cooperation group. According to certain embodiments, determining a resource set may include any of determining whether one or more of the other UE D2D devices is assigned a same resource set as the resource set of the UE D2D device and determining a time period within the resource set that is assigned to the one or more of the other UE D2D devices. According to certain embodiments, the UE D2D device may transmit the D2D data at a time period different than a time period in which the one or more of other UE D2D devices transmits D2D data.

According to embodiments, determining a resource set may include modifying a current resource set used in a previous transmission of D2D data. According to certain embodiments, a resource set may be modified based on one or more of a high level of interference detected by the UE and a message received from one or more of another UE D2D device, an eNB, and a roadside unit. According to certain embodiments, a resource set may be modified based on any of changing TRPT resources, simultaneously transmitting the D2D data using more than one resource set, and transmitting the D2D data across an entirety of a scheduled transmission period.

According to embodiments, determining a resource set may include determining whether there is a resource conflict. According to certain embodiments, a resource conflict may be determined based on receiving a broadcast message including information on one or more resource sets, determining whether there is a conflict between a resource set of the UE and one or more resource sets received via a broadcast message, and changing resource sets by selecting a new resource set that does not conflict with any of one or more resource sets received via a broadcast message. According to certain embodiments, information on one or more resource sets may indicate that one or more resource sets are assigned to other UEs.

According to certain embodiments, a new resource set may be selected based upon determining a resource set that does not conflict with any of one or more resource sets received via a broadcast message. According to certain embodiments, a new resource set may be selected based upon communicating with a UE D2D device corresponding to the resource conflict to determine a new resource set that does not conflict with any of the one or more resource sets received via the broadcast message.

According to embodiments, a UE D2D device may report a conflict, such as, for example, a resource conflict, to an eNB and/or any other device executing V2V communications. According to certain embodiments, a UE D2D device may select a new resource set that does not conflict with any of one or more resource sets received via a broadcast message based on a resource set indicated by an eNB.

At operation 1104, the UE D2D device may transmit the D2D data using the determined one or more resource sets. According to embodiments, the D2D data may be transmitted to a relay device for relaying the D2D data. According to certain embodiments, the relay device may be one or more of a UE D2D device, an eNB, and a roadside unit. According to embodiments, the D2D data may be transmitted using more than one carrier. According to certain embodiments, transmitting D2D data using more than one carrier may include any of a change of carrier for D2D transmissions and simultaneously transmitting a D2D transmission on more than one carrier.

Figure 12:
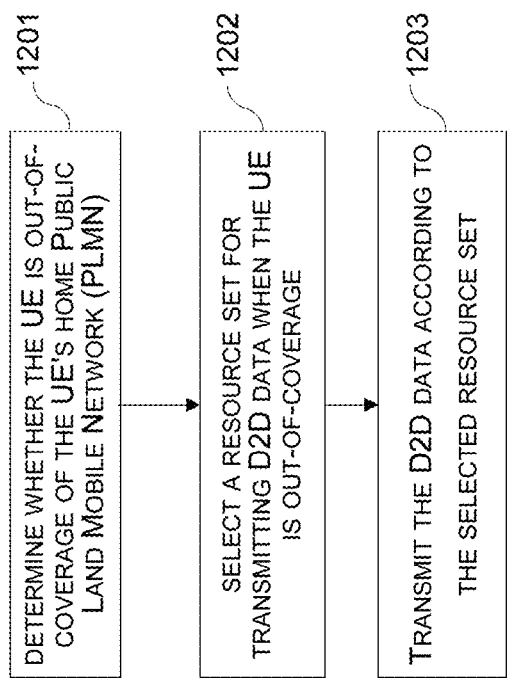
FIG. 12 is a diagram illustrating a flowchart for executing V2V communications across multiple networks according to an embodiment.

FIG. 12 illustrates a flowchart for executing V2V communications across multiple networks according to embodiments.

Referring to FIG. 12, a method for a UE operating on a D2D LTE network to perform V2V communications across multiple networks is illustrated. The method illustrated in FIG. 12 may be implemented according to and/or by a variety of embodiments including a vehicular communication system that includes any full or partial combination of communication systems and apparatus embodiments illustrated in FIGS. 1-5.

At operation 1201, a UE may determining whether the UE is out-of-coverage of the UE's home PLMN. For example, the UE may determine that it is out-of-coverage of the UE's home PLMN based on information associated with any of one or more PLMS, a signal strength associated with a PLMN, a signal quality associated with a PLMN, or any other suitable and/or similar information used to determine whether a UE is out-of-coverage of a network. At operation 1202, a UE may select a resource set for transmitting D2D data when the UE is out-of-coverage. At operation 1203, the UE may transmit the D2D data according to the selected resource set. According to embodiments, the selected resource set may correspond to a dedicated V2V frequency used by more than one PLMN. According to certain embodiments, the UE may transmit a message informing other UEs that belong to a PLMN other than the Home PLMN of V2V resources of the Home PLMN. According to certain embodiments, an eNB of a Home PLMN may transmit a list of frequencies used by one or more other PLMNs to provide V2V services.

Figure 13:
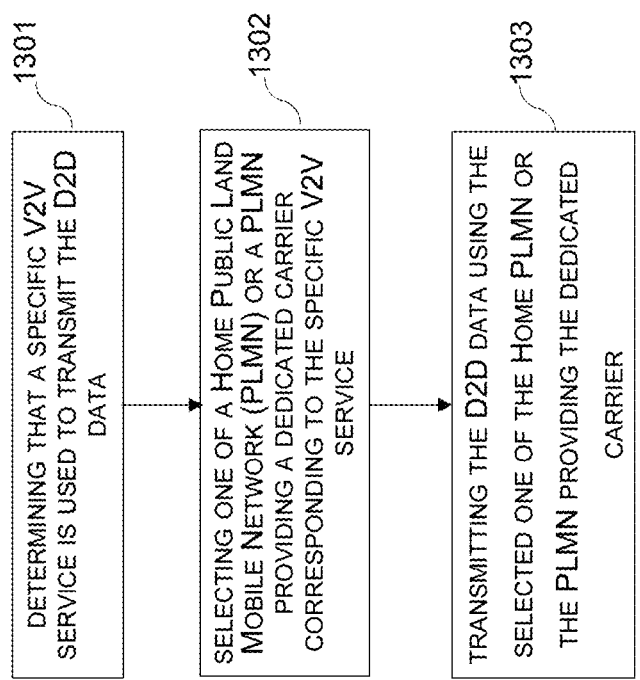
FIG. 13 is a diagram illustrating a flowchart for executing communications between different networks of V2V communications according to an embodiment.

FIG. 13 illustrates a flowchart for executing communications between different networks of V2V communications according to embodiments.

Referring to FIG. 13, a method for a UE performing communications between different networks of V2V communications using a D2D LTE network is illustrated. The method illustrated in FIG. 13 may be implemented according to and/or by a variety of embodiments including a vehicular communication system that includes any full or partial combination of communication systems and apparatus embodiments illustrated in FIGS. 1-5. At operation 1301, a UE may determining that a specific V2V service is used to transmit the D2D data. At operation 1302, the UE may select one of a Home PLMN or a PLMN providing a dedicated carrier corresponding to the specific V2V service. At operation 1303, the UE may transmit D2D data using the selected one of the Home PLMN or the PLMN providing the dedicated carrier.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements.

The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1-5.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method, implemented by a wireless transmit/receive unit (WTRU), for performing Device-to-Device (D2D) communications using a wireless network, the method comprising:
   receiving configuration information associated with D2D transmission adaption;
   measuring energy of resources associated with a resource pool;
   determining that resource usage of the resources exceeds a threshold based on the measurements;
   determining a number of allowed retransmissions for a first transmission sent via the resources of the resource pool based on the configuration information and the determination that the resource usage of the resources exceeds the threshold;
   determining a transmit power and a modulation and coding scheme (MCS) for the first transmission based on the configuration information and the determination that the resource usage of the resources exceeds the threshold; and
   transmitting the first transmission over at least one of the resources associated with the resource pool using the determined transmit power and MCS.

2. The method of claim 1, wherein the resources comprise physical resources blocks (PRBs) associated with the resource pool.

3. The method of claim 1, wherein the first transmission is a Physical Sidelink Shared Channel (PSSCH) transmission or a Physical Sidelink Control Channel (PSCCH) transmission.

4. The method of claim 1, further comprising:
   retransmitting the first transmission in accordance with the determined number of allowed retransmissions.

5. The method of claim 1, wherein the threshold is configured to manage congestion control for the resources associated with the resource pool.

6. The method of claim 1, further comprising:
   dropping at least a second transmission based on a determination that resource usage exceeds a configured threshold.

7. The method of claim 1, further comprising:
   determining a transmission backoff for transmissions via the resources associated with the resource pool based on the configuration information and the determination that the resource usage of the resources exceeds the threshold.

8. The method of claim 1, wherein the configuration information associated with D2D transmission adaption comprises a table that indicates a measured energy threshold associated with a transmission parameter.

9. The method of claim 1, further comprising:
   determining subframes for transmissions via the resources of the resource pool based on the configuration and the determination that the resource usage of the resources exceeds the threshold.

10. The method of claim 1, wherein the SL configuration information associated with D2D transmission adaption comprises a set of thresholds associated with D2D transmission adaption.

11. A wireless transmit/receive unit (WTRU) configured to execute Device-to-Device (D2D) communications using a wireless network, the WTRU comprising a processor and memory configured to:
   receive configuration information associated with D2D transmission adaption;
   measure energy of resources associated with a resource pool;
   determine that resource usage of the resources exceeds a threshold based on the measurements;
   determine a number of allowed retransmissions for a first transmission sent via the resources of the resource pool based on the configuration information and the determination that the resource usage of the resources exceeds the threshold;
   determine a transmit power and a modulation and coding scheme (MCS) for the first transmission based on the configuration information and the determination that the resource usage of the resources exceeds the threshold; and
   transmit the first transmission over at least one of the resources associated with the resource pool using the determined transmit power and MCS.

12. The WTRU of claim 11, wherein the resources comprise physical resources blocks, PRBs, associated with the resource pool.

13. The WTRU of claim 11, wherein the first transmission is a Physical Sidelink Shared Channel (PSSCH) transmission or a Physical Sidelink Control Channel (PSCCH) transmission.

14. The WTRU of claim 11, wherein the threshold is configured to manage congestion control for the resources associated with the resource pool.

15. The WTRU of claim 11, wherein the processor is further configured to:
   retransmit the first transmission in accordance with the determined number of allowed retransmissions.

16. The WTRU of claim 11, wherein the processor is further configured to:
   drop at least a second transmission based on a determination that resource usage exceeds a configured threshold.

17. The WTRU of claim 11, wherein the processor is further configured to:
   determine a transmission backoff for transmissions via the resources associated with the resource pool based on the configuration information and the determination that the resource usage of the resources exceeds the threshold.

18. The WTRU of claim 11, wherein the SL configuration information associated with D2D transmission adaption comprises a set of thresholds associated with D2D transmission adaption.

19. The WTRU of claim 11, wherein the configuration information associated with D2D transmission adaption comprises a table that indicates a measured energy threshold associated with a transmission parameter.

20. The WTRU of claim 11, wherein the processor is further configured to:
    determine subframes for transmissions via the resources of the resource pool based on the configuration and the determination that the resource usage of the resources exceeds the threshold.

* * * * *